US008565258B2

(12) United States Patent
Yamaguchi et al.

(10) Patent No.: US 8,565,258 B2
(45) Date of Patent: Oct. 22, 2013

(54) TERMINAL CAPABLE OF SUBSTITUTING FOR CONTROL STATION

(75) Inventors: Tsuyoshi Yamaguchi, Osaka (JP); Shinichiro Ohmi, Osaka (JP); Go Kuroda, Osaka (JP)

(73) Assignee: Panasonic Corporation, Osaka (JP)

( * ) Notice: Subject to any disclaimer, the term of this patent is extended or adjusted under 35 U.S.C. 154(b) by 234 days.

(21) Appl. No.: 12/967,496

(22) Filed: Dec. 14, 2010

(65) Prior Publication Data

US 2011/0161490 A1    Jun. 30, 2011

Related U.S. Application Data

(62) Division of application No. 10/589,240, filed as application No. PCT/JP2005/003820 on Feb. 28, 2005, now abandoned.

(30) Foreign Application Priority Data

Mar. 1, 2004    (JP) .................................. 2004-56601

(51) Int. Cl.
    *H04J 3/02*    (2006.01)
(52) U.S. Cl.
    USPC ........................................................ 370/462
(58) Field of Classification Search
    USPC ........................................................ 370/462
    See application file for complete search history.

(56) References Cited

U.S. PATENT DOCUMENTS

| 4,768,190 | A | 8/1988 | Giancarlo |
| 5,430,843 | A | 7/1995 | Sato et al. |
| 5,815,816 | A | 9/1998 | Isumi |
| 6,359,889 | B1* | 3/2002 | Tazaki et al. ............. 370/395.61 |
| 6,671,284 | B1 | 12/2003 | Yonge, III et al. |
| 6,680,903 | B1* | 1/2004 | Moriguchi et al. ........... 370/216 |
| 7,002,918 | B1 | 2/2006 | Prieto, Jr. et al. |
| 2002/0032025 | A1* | 3/2002 | Maeshima et al. ............ 455/422 |
| 2003/0054821 | A1 | 3/2003 | Kita et al. |

(Continued)

FOREIGN PATENT DOCUMENTS

| EP | 0 244 251 | 11/1987 |
| JP | 63-199540 | 8/1988 |

(Continued)

OTHER PUBLICATIONS

International Search Report issued Jun. 10, 2005 in International Application No. PCT/JP2005/003820.

(Continued)

*Primary Examiner* — Huy D Vu
*Assistant Examiner* — Adnan Baig
(74) *Attorney, Agent, or Firm* — Wenderoth, Lind & Ponack, L.L.P.

(57) ABSTRACT

A terminal of the present invention comprises a control frame detection portion of detecting a control frame issued from a control station, a control frame memory portion of storing control information contained in the control frame, a substitute frame issuance determination portion of determining to issue a substitute frame when the control frame is not detected until a predetermined first time period is elapsed, and a substitute frame issuance portion of creating a frame which is the same as or equivalent to the control frame, as the substitute frame, based on the control information stored in the control frame memory portion when the substitute frame issuance determination portion determines to issue the substitute frame, and issuing the created substitute frame.

4 Claims, 17 Drawing Sheets

(56) References Cited

U.S. PATENT DOCUMENTS

| | | |
|---|---|---|
| 2003/0063619 A1 | 4/2003 | Montano et al. |
| 2004/0002338 A1 | 1/2004 | Spartz et al. |
| 2006/0244624 A1 | 11/2006 | Wang et al. |

FOREIGN PATENT DOCUMENTS

| | | |
|---|---|---|
| JP | 2563935 | 12/1996 |
| JP | 2798329 | 9/1998 |
| JP | 11-008585 | 1/1999 |
| JP | 2001-136177 | 5/2001 |
| JP | 2002-16646 | 1/2002 |
| JP | 2003-134040 | 5/2003 |
| JP | 2003-134124 | 5/2003 |
| JP | 2005-538574 | 12/2005 |

OTHER PUBLICATIONS

Leen, G. and D. Heffernan, "TTCAN: a new time-triggered controller area network", Microprocessors and Microsystems, (Mar. 2002), 26:77-94.

Takahiro Nakano et al., "Design and Implementation of a QoS Assurance Mechanism on Ethernet", Journal of Information Processing Society of Japan, vol. 41, No. 2, Information Processing Society of Japan, Feb. 15, 2000, pp. 322-332 (with partial English translation).

* cited by examiner

F I G. 8
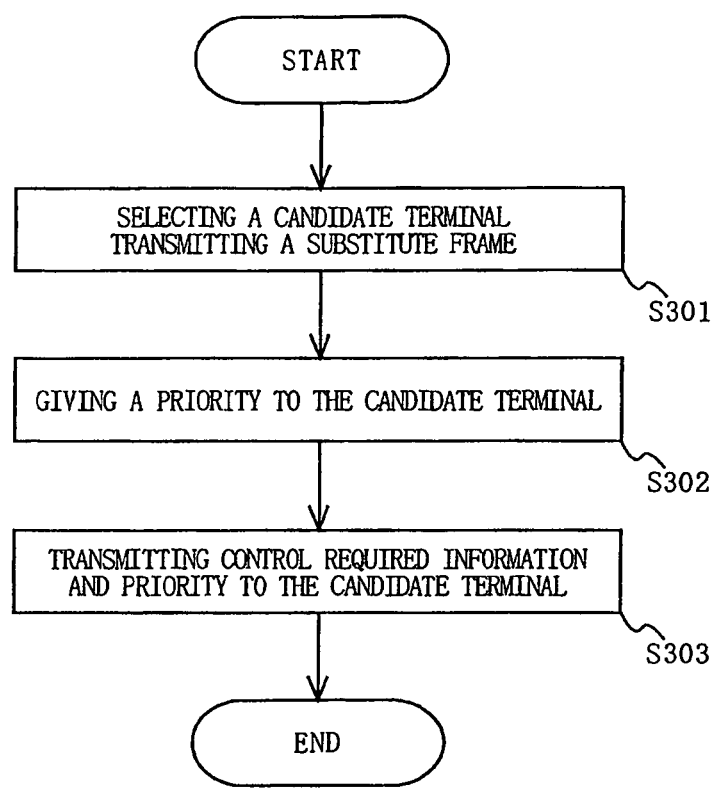

TERMINAL CAPABLE OF SUBSTITUTING FOR CONTROL STATION

This application is a divisional of application Ser. No. 10/589,240, filed on Aug. 14, 2006, now abandoned which is the National Stage of International Application No. PCT/JP2005/003820, filed Feb. 28, 2005.

TECHNICAL FIELD

The present invention relates to a terminal whose opportunity to access a communication medium is controlled by a control station, and more particularly, to a terminal capable of substituting for a control station.

BACKGROUND ART

A communication system which utilizes media having a problem with communication quality is provided with a control station for controlling media access of other station(s) in order to utilize media as efficiently as possible. The other station is regarded as a controlled station, i.e., the control station and the controlled station have a master-slave relationship. In this manner, a central control type communication system protocol which can improve the efficiency of the entire communication system has been developed.

When such a protocol is applied to a wireless LAN, a power line communication system and the like, the efficiency of media access in the communication system is significantly influenced by communication quality of a control station and a controlled station which depends on, for example, a physical positional relationship therebetween.

Japanese Patent Laid-Open Publication No. H11-8585 (Patent Publication 1) discloses a terminal which operates in a control station mode and in a controlled station mode (two operational forms) and can select the operational forms. In a communication system described in Patent Publication 1, the terminal detects the operating modes of surrounding terminals after being powered on, and when there is no detected terminal which is activated as a control station, operates as a control station.

In a communication system having a control station, it is necessary to consider the possibility that the control station gets out of order during operation. Further, in a power line communication system or the like, it is considered that a station is repeatedly connected and disconnected. When a control station is disconnected from the communication system, it is necessary to, for example, reconstruct a control station in order to achieve efficient media access. However, in the technology of Patent Publication 1, it is not possible to reconstruct a control station, so that the communication quality of a communication system cannot be maintained.

Japanese Patent No. 2563935 (Patent Publication 2) proposes a concept that a control station transfers its information to a controlled station (another station) during operation, and when the control station is suddenly disconnected from a network, the controlled station quickly replaces the control station to maintain network quality (Patent Publication 2).

However, in a network employing a medium, such as a radio wave or a power line, in which the reliability of transmission characteristics varies significantly depending on a physical positional relationship between stations, the location of a control station has a significant influence on the transmission efficiency of the whole network. Therefore, unless a control station is determined, taking into consideration the location on a network of connection of a terminal, the performance of a terminal, or the like, there is a possibility that the communication quality is significantly impaired upon replacement.

In a network in which importance is particularly placed on the transmission efficiency and the Quality of Service (QoS) guarantee required by an application, a procedure for changing control stations needs to be sufficiently prepared in advance. Furthermore, a control station may be accidentally disconnected before giving information as described in Patent Publication 2. In this case, it may be difficult to reconstruct a control station using latest information, a control request which has been once accepted may be lost so that latest information cannot be inherited, or a network system itself may not function.

A terminal which operates as a control station is often designed to be connected to a location suitable for control of a network, taking the importance of the function thereof into consideration. Also, it is often that a control station is capable of recovering itself quickly if it is disconnected from a network for some reason. Therefore, when a control station is disconnected from a communication system, in general it is not always satisfactory to replace the control station with a new one. It is often satisfactory that the original control station returns to a media access control.

DISCLOSURE OF THE INVENTION

Therefore, a first object of the present invention is to provide a terminal having a guaranteeing mechanism such that, when an operating control station is disconnected from a communication system for some reason, media access of the communication system can be prevented from falling into an inefficient situation for a long time, without sudden replacement with a new control station. Further, a second object of the present invention is to provide a terminal having a mechanism such that, when a control station which has been disconnected from a communication system is recovered, a media access control is returned to the original control station. Furthermore, a third object of the present invention is to a terminal which can maintain the communication quality of a whole communication system using a simple mechanism against temporary disconnection of a control station.

To solve the problems, the present invention provides a terminal whose opportunity to access a communication medium is controlled in accordance with a control frame issued from a control station connected to a network, comprises a control frame detection portion of detecting the control frame issued from the control station, a control frame memory portion of storing control information contained in the control frame, a substitute frame issuance determination portion of determining to issue a substitute frame when the control frame detection portion does not detect the control frame until a predetermined first time period is elapsed, and a substitute frame issuance portion of creating a frame which is the same as or equivalent to the control frame, as the substitute frame, based on the control information stored in the control frame memory portion when the substitute frame issuance determination portion determines to issue the substitute frame, and issuing the created substitute frame.

Preferably, the control frame memory portion may store the control frame only when the control frame has a change.

Preferably, the substitute frame issuance portion may transmit a refusal response frame indicating that a request which is transmitted from another terminal and should be responded to by the control station is refused, during issuance of the substitute frame periodically.

Preferably, the substitute frame issuance portion may not respond to a request which is transmitted from another terminal and should be responded to by the control station, during issuance of the substitute frame periodically.

Preferably, the substitute frame issuance portion may stop issuing the substitute frame during issuance of the substitute frame periodically, if receiving a frame from the control station.

Preferably, the substitute frame issuance portion may determine whether or not a frame is received from the control station until a predetermined second time period is elapsed. The terminal may further comprise a control station mode portion of causing the terminal to operate as a control station when the substitute frame issuance portion determines that a frame is not received from the control station until the predetermined second time period is elapsed.

Preferably, the control station mode portion may collect information required as a control station from another terminal.

Preferably, the control station mode portion may issue a reset signal to collect information required as a control station from another terminal.

Preferably, when the control frame is not detected until the first time period is elapsed, the terminal may try to access the communication medium in accordance with control information contained in a previously received control frame.

Preferably, the substitute frame issuance portion may compete for a right to access the communication medium before issuing the substitute frame, and when acquiring the access right, issues the substitute frame.

Preferably, a candidate terminal which issues the substitute frame may be designated by the control station. The candidate terminal may be given a priority. A terminal having a higher priority may have a higher probability of acquiring the access right in the access right competition for issuance of the substitute frame.

Preferably, a candidate terminal which issues the substitute frame may be designated by the control station. The terminal may further comprise a candidate terminal designation recognition portion of recognizing whether or not the control station designates the terminal as the candidate terminal. When the candidate terminal designation recognition portion recognizes that the terminal is designated as the candidate terminal, the substitute frame issuance determination portion may determine whether or not to issue the substitute frame, assuming that a time period which is shorter than a first time period in a terminal which is not designated as the candidate terminal, is the first time period.

Preferably, the candidate terminal may be given a priority. The substitute frame issuance determination portion may use a first time period having a length corresponding to the priority to determine whether or not to issue the substitute frame.

Preferably, the candidate terminal may be designated by the control station based on information about a communication state of a terminal in the network.

Preferably, in a situation that the terminal is designated as a candidate terminal, when the control station designates another terminal as a candidate terminal, the designation of the terminal as a candidate terminal may be released.

Preferably, an identifier for the control station may be described in the control frame.

Preferably, the terminal may operate as the control station when an identifier for the terminal is described in the substitute frame.

The present invention also provides a method executed in a terminal whose opportunity to access a communication medium is controlled in accordance with a control frame issued from a control station connected to a network, comprising detecting the control frame issued from the control station, storing control information contained in the control frame, determining to issue a substitute frame when the control frame is not detected until a predetermined first time period is elapsed, creating a frame which is the same as or equivalent to the control frame, as the substitute frame, based on the stored control information when it is determined to issue the substitute frame, and issuing the created substitute frame.

The present invention also provides a program executed in a terminal whose opportunity to access a communication medium is controlled in accordance with a control frame issued from a control station connected to a network, comprising detecting the control frame issued from the control station, storing control information contained in the control frame, determining to issue a substitute frame when the control frame is not detected until a predetermined first time period is elapsed, creating a frame which is the same as or equivalent to the control frame, as the substitute frame, based on the stored control information when it is determined to issue the substitute frame, and issuing the created substitute frame.

The present invention also provides a computer-readable recording medium storing a program executed in a terminal whose opportunity to access a communication medium is controlled in accordance with a control frame issued from a control station connected to a network. The program comprises detecting the control frame issued from the control station, storing control information contained in the control frame, determining to issue a substitute frame when the control frame is not detected until a predetermined first time period is elapsed, creating a frame which is the same as or equivalent to the control frame, as the substitute frame, based on the stored control information when it is determined to issue the substitute frame, and issuing the created substitute frame.

Hereinafter, effects of the present invention will be described. According to the present invention, when a control station which plays an important role in maintaining communication quality is disconnected from a communication system for some reason, a substitute frame which is the same as or equivalent to a control frame previously transmitted, is transmitted. Therefore, communication quality which is the same as that at the time of the disconnection is maintained, and in addition, it is possible to avoid a situation that media access to the communication system falls into an inefficient state for a long time.

Further, when an original control station resumes communication within a predetermined time period, issuance of the substitute frame is stopped. Thereby, the original control station can be recovered.

Also, when the original control station does not resume communication after the predetermined time period is elapsed, a new control station starts operating, thereby making it possible to avoid a situation that a control station is absent for a long time period.

A terminal which issues a substitute frame transmits a refusal response frame in response to a request which is transmitted from another terminal and should be responded to by a control station, or does not respond to it. Therefore, the terminal which issues a substitute frame does not necessarily require a function as a control station. Note that the terminal which issues a substitute frame is provided with a function as a control station so as to prepare a situation that a control station would not be recovered. It is useful to previously designate such a terminal as a candidate terminal which issues a substitute frame.

Thus, a terminal having a simple mechanism and capable of maintaining communication quality of an entire communication system is provided, thereby making it possible to minimize a decrease in communication quality in a communication system.

These and other objects, features, aspects and advantages of the present invention will become more apparent from the following detailed description of the present invention when taken in conjunction with the accompanying drawings.

BRIEF DESCRIPTION OF THE DRAWINGS

FIG. 8 is a flowchart showing an operation of a control station.

BEST MODE FOR CARRYING OUT THE INVENTION

Hereinafter, embodiments of the present invention will be described with reference to the accompanying drawings. In a communication system described in the embodiment below, a central control type communication system protocol in which media access of each terminal is controlled by a control station is employed.

First Embodiment

Figure 1:
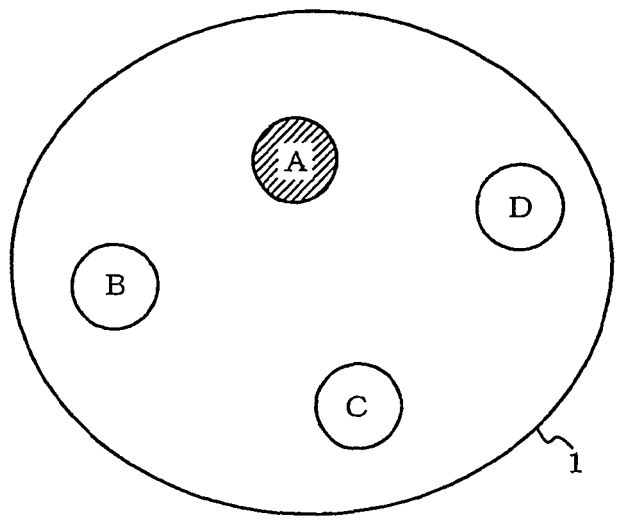
FIG. 1 is a diagram schematically showing a structure of a whole communication system 1 according to a first embodiment of the present invention.

FIG. 1 is a diagram schematically showing a structure of a whole communication system 1 according to a first embodiment of the present invention. The communication system 1 comprises a control station and a controlled station which is under a control of the control station. In FIG. 1, a terminal A is a control station which issues a signal for controlling an opportunity of media access by a terminal which participates in the communication system 1 (hereinafter referred to as a control frame). Terminals B, C and D are controlled stations. The control frame is also called a beacon. Note that the number of terminals in the present invention is not limited to that which is shown in FIG. 1. The terminals may be communicated with one another via wireless communication, wired communication or high-speed power line communication. A network to which the terminals are connected is not particularly limited.

The control station A periodically issues a control frame containing control information and informs the controlled terminals of the control frame. In the control information contained in the control frame, a time when media access is permitted and a time interval are described for each controlled station or each transmission queue of controlled stations. The control information further contains a start time of a time period during which a media access right is acquired by competition, information for controlling media access for the time period during which a media access right is acquired by competition, and the like.

The controlled stations B, C and D store contents of a control frame every time the control frame is received. Note that the contents of the control frame may be stored only when the contents of the control frame include a change.

When not having received a control frame issued by the control station for a predetermined TIME_BC_WAIT time (first time period), a controlled station capable of operating as a control station creates a substitute frame using control information which is stored since a control frame had been received, and performs media access competition for transmission of the substitute frame. When winning the competition, the controlled station starts transmitting the substitute frame periodically. A terminal which transmits a substitute frame periodically is referred to as a substitution control station.

The substitute frame contains the control information which is contained in the received control frame, without modification, so that the substitute frame is the same as the control frame. Alternatively, the substitute frame contains information equivalent to the control information which is contained in the received control frame, so that the substitute frame is equivalent to the control frame. Here, when information contained in the substitute frame inherits the control information which is contained in the control frame, it is expressed that the substitute frame is the same as or equivalent to the control frame. Information contained in the substitute frame is considered to inherit the control information which is contained in the control frame, for example, when the substitute frame is completely the same as the control frame; when the substitute frame contains at least the control information contained in the control frame; when the information contained in the substitute frame is compatible with the control information contained in the control frame. When the substitute frame contains at least the control information contained in the control frame, the substitute frame may contain other information, such as, for example, a flag which informs that the frame is a substitute frame, a terminal identifier of a substitution control station, or the like.

Figure 2:
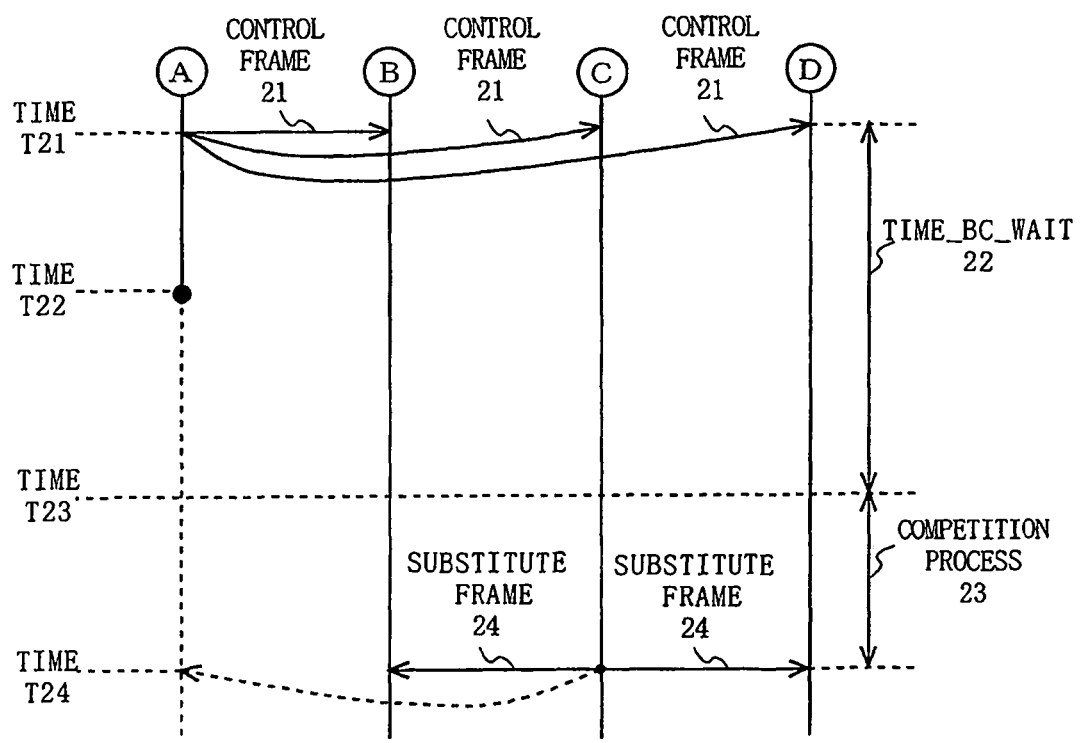
FIG. 2 is a timing chart for explaining an exemplary operation in the communication system of FIG. 1.

FIG. 2 is a timing chart for explaining an exemplary operation in the communication system of FIG. 1. Hereinafter, the exemplary operation in the communication system of FIG. 1 will be described with reference to FIG. 2. In FIG. 2, a vertically downward direction is assumed to be the positive direction of a time axis.

Firstly, at time T21, the control station A is assumed to transmit a control frame 21. The control frame 21 transmitted at time T21 is received by the controlled stations B, C and D. The controlled stations B, C and D store control information contained in the received control frame. Thereafter, at time T22, the control station A is disconnected from the communication system 1. Thereby, thereafter, the control station A no longer issues a control frame.

When a situation in which a control frame cannot be received continues for a TIME_BC_WAIT time 22 (first time period), the controlled stations B, C and D execute a competition process for media access in order to issue a substitute frame. Note that the competition process is not required when a substitute frame is normally issued without the competition process. Note that each terminal has a guaranteeing function such that when no control frame can be detected for the TIME_BC_WAIT time 22, the terminal operates in accordance with a latest control frame among those which have been received.

It is assumed that the controlled station C wins a competition process performed from time T23 to time T24. The controlled station C issues a substitute frame 24. Thereafter, the controlled stations B and D execute media access in accordance with the substitute frame 24 issued by the controlled station C.

Figure 3:
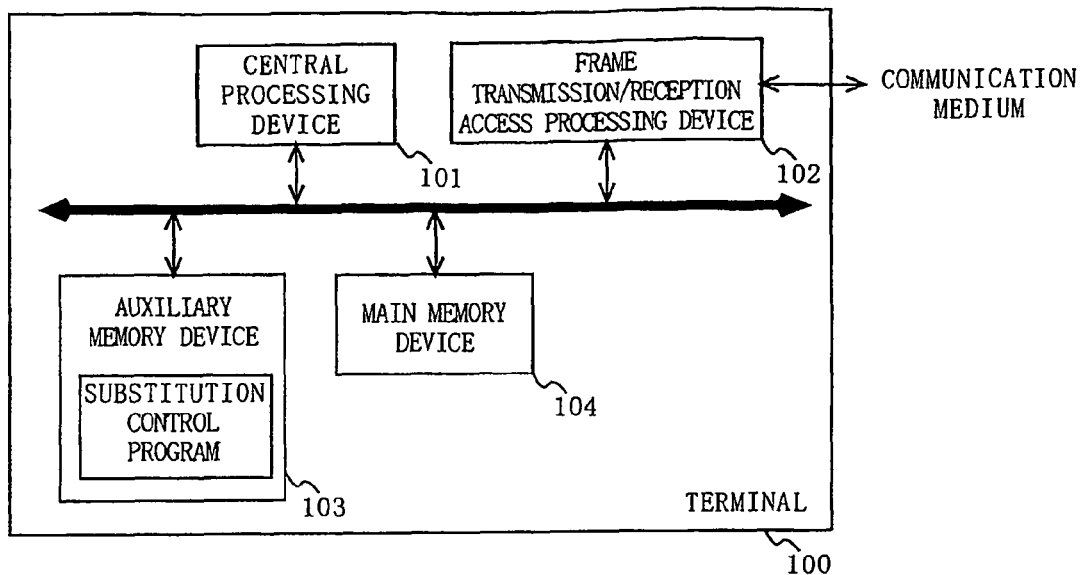
FIG. 3 is a block diagram showing a hardware structure of a terminal 100 which functions as a controlled station.

FIG. 3 is a block diagram showing a hardware structure of a terminal 100 which functions as a controlled station. The terminal 100 is, for example, any of the controlled stations B, C and D. In FIG. 3, the terminal 100 comprises a central processing device 101, a frame transmission/reception access processing device 102, an auxiliary memory device 103, and a main memory device 104. Note that a control station can also function as a controlled station, and therefore, a terminal which functions as a control station has a hardware structure similar to that of FIG. 3.

The frame transmission/reception access processing device 102 is an interface between a communication medium and the terminal 100, and modulates a frame to be transmitted and demodulates a received frame. The frame transmission/reception access processing device 102 mainly executes processes in lower layers, such as a physical layer, an MAC layer and the like.

The auxiliary memory device 103 is a memory device, such as a ROM, a RAM, a hard disk, an optical disc or the like. The auxiliary memory device 103 stores firmware or software which is executed in the central processing device 101. The auxiliary memory device 103 stores a substitution control program for causing the terminal 100 to execute an operation of the present invention. The substitution control program may be either firmware or software. The auxiliary memory device 103 optionally stores information which is provided by the central processing device 101.

The main memory device 104 is a RAM or the like and stores a program or information in accordance with an instruction from the central processing device 101.

The central processing device 101 executes a predetermined process, and causes the main memory device 104 to read firmware or software stored in the auxiliary memory device 103 and executes the firmware or software. The central processing device 101 also causes the frame transmission/reception access processing device 102 to transmit/receive a frame. Thus, the central processing device 101 controls operations of the entire terminal 100. The central processing device 101 causes the auxiliary memory device 103 and/or the main memory device 104 to store information required for processing.

Figure 4:
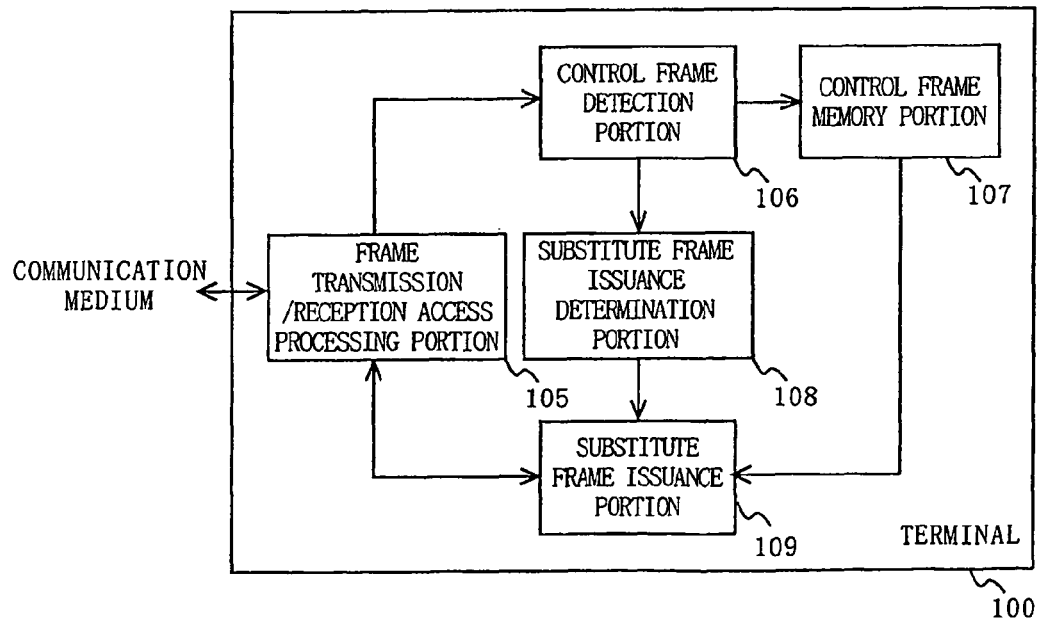
FIG. 4 is a block diagram showing a functional structure of the terminal 100 which is executing a substitution control program.

FIG. 4 is a block diagram showing a functional structure of the terminal 100 which is executing the substitution control program. In FIG. 4, the terminal 100 comprises a frame transmission/reception portion 105, a control frame detection portion 106, a control frame memory portion 107, a substitute frame issuance determination portion 108, and a substitute frame issuance portion 109.

The frame transmission/reception portion 105 transmits/receives a frame to/from a communication medium. The frame transmission/reception portion 105 transfers a received frame to the control frame detection portion 106 and the substitute frame issuance portion 109.

The control frame detection portion 106 determines whether or not a frame received by the frame transmission/reception portion 105 is a control frame. When the frame received by the frame transmission/reception portion 105 is a control frame, the control frame detection portion 106 causes the control frame memory portion 107 to store the whole control frame or control information described in the control frame.

The control frame memory portion 107 stores the control information described in the control frame transferred from the control frame detection portion 106.

The substitute frame issuance determination portion 108 determines whether or not the current control station is disconnected from the communication system 1, thereby determining whether or not to issue a substitute frame. For example, when the control frame detection portion 106 does not detect a control frame for a predetermined first time period (e.g., TIME_BC_WAIT time), the substitute frame issuance determination portion 108 determines that the current control station is disconnected from the communication system 1, thereby determining to issue a substitute frame. Although the TIME_BC_WAIT time is here used as the first time period, the number of frame counted may be used. Specifically, the substitute frame issuance determination portion 108 counts the number of frames after receiving a control frame. When the number of frames exceeds a predetermined value, and nevertheless, the control frame detection portion 106 does not detect a control frame, the substitute frame issuance determination portion 108 determines that the current control station is disconnected from the communication system 1, thereby determining to issue a substitute frame. In this case, a time period until the number of received frames exceeds the predetermined value is the first time period. Note that the first time period is not limited to that described above and may be any time period during which it can be determined whether or not a control section is disconnected from the communication system 1.

When the substitute frame issuance determination portion 108 determines to issue a substitute frame, the substitute frame issuance portion 109 creates a frame which is the same as or equivalent to a control frame issued by a control station, as a substitute frame, based on the control information stored in the control frame memory portion 107. The substitute frame issuance portion 109 executes a competition process for accessing a communication medium, via the frame transmission/reception portion 105 in accordance with a procedure predetermined in the communication system 1, such as a CSMA/CA scheme or the like. When a right to access a communication medium is obtained as a result of the competition process, the substitute frame issuance portion 109 creates and issues a substitute frame and causes the frame transmission/reception portion 105 to transmit the substitute frame to the communication medium.

Figure 5:
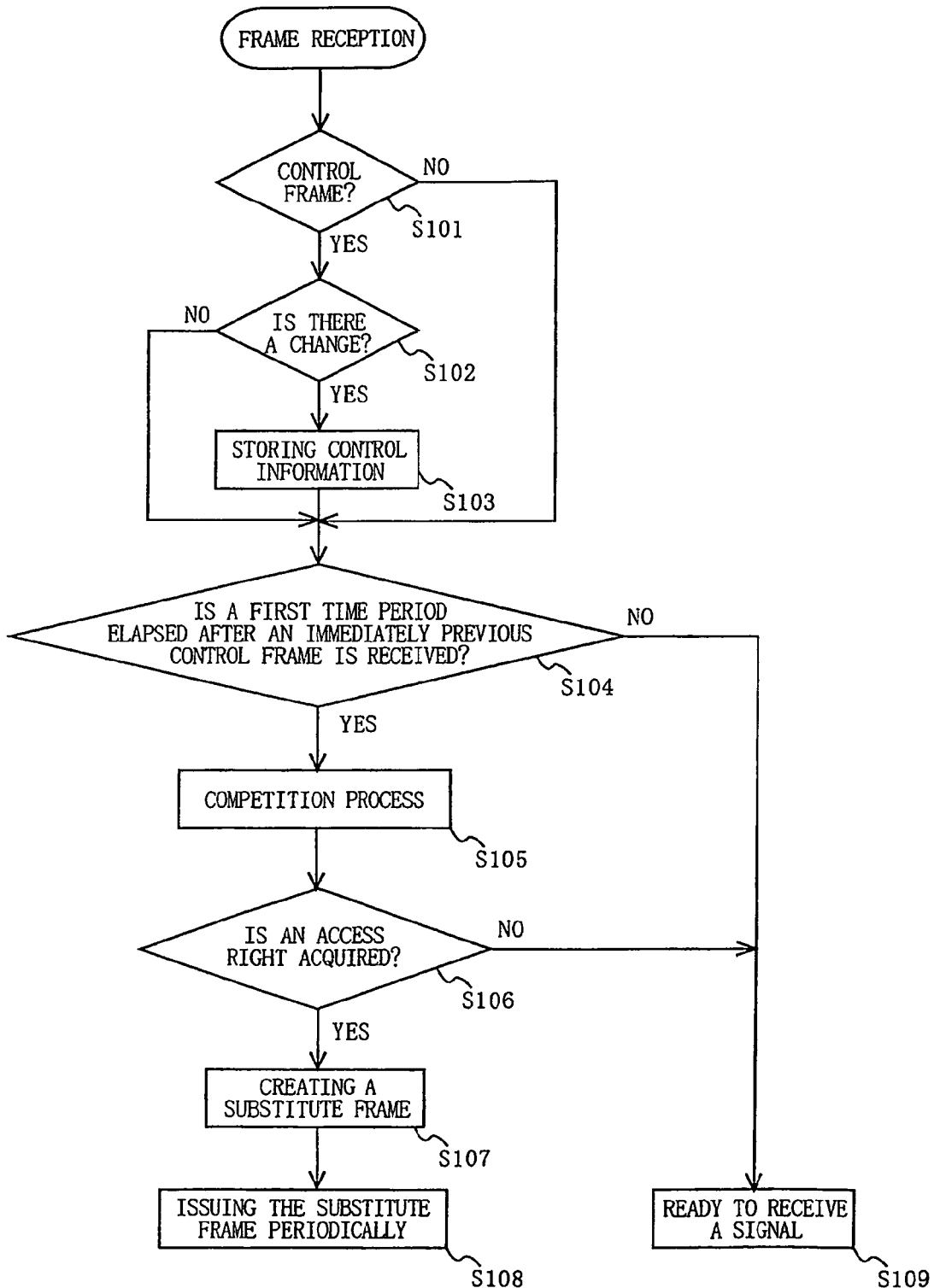
FIG. 5 is a flowchart showing an operation of the terminal 100 when the substitution control program is executed.

FIG. 5 is a flowchart showing an operation of the terminal 100 when the substitution control program is executed. Hereinafter, the operation of the terminal 100 when the substitution control program is executed will be described with reference to FIG. 5. Hereinafter, for the sake of simple explanation of the operation, main bodies of operation of steps in FIG. 5 are associated with the blocks of FIG. 4. In fact, the terminal 100 which executes the substitution control program employs the hardware of FIG. 3 to execute the procedure of FIG. 5. Therefore, the main bodies of operations of the steps in FIG. 5 can be replaced with the central processing device 101, the frame transmission/reception access processing device 102, the auxiliary memory device 103, and the main memory device 104 when implemented by hardware. This replacement is obvious to those skilled in the art and will not be explained.

The operation of FIG. 5 is started by frame reception of the terminal 100 as a trigger. Initially, the control frame detection portion 106 determines whether or not the received frame is a control frame (step S101). When the received frame is a control frame, the terminal 100 goes to an operation of step S102. On the other hand, when the received frame is not a control frame, the terminal 100 goes to an operation of step S104.

In step S102, the control frame detection portion 106 compares the previously received control frame and the currently received control frame to determine whether or not the currently received control frame includes a change. Note that when an identifier which indicates that a change is made or a change has been made is provided in a control frame, the control frame detection portion 106 may determine, based on the identifier, whether or not the control frame includes a change. When the currently received control frame does not include a change, the terminal 100 goes to the operation of step S104. On the other hand, when the currently received control frame includes a change, the control frame detection portion 106 causes the control frame memory portion 107 to store control information described in the currently received control frame (step S103). Thereafter, the terminal 100 goes to the operation of step S104. Note that the control frame detection portion 106 may not determine whether or not there is a change between control frames and may cause the control frame memory portion 107 to invariably store control information described in a newly received control frame. In other words, the present invention is not limited to the operation of FIG. 5 as long as latest control information is stored in the control frame memory portion 107.

In step S104, the substitute frame issuance determination portion 108 determines whether or not the first time period is elapsed from reception of an immediately previous control frame. When the first time period is not elapsed, the terminal 100 becomes ready to receive a frame (step S109). When receiving a frame again, the terminal 100 starts an operation from step S101. On the other hand, when the first time period is elapsed, the terminal 100 goes to an operation of step S105. Note that the determination of step S104 is always performed, and when the first time period is elapsed from reception of an immediately previous control frame, the terminal 100 performs an interrupt process to execute operations of steps S105 to S108 no matter whether or not a frame is received.

In step S105, the substitute frame issuance portion 109 executes a competition process for accessing a communication medium in accordance with a procedure predetermined in the communication system 1 (step S105). Next, the substitute frame issuance portion 109 determines, based on a result of the competition, whether or not a right to access the communication medium is acquired (step S106). When the access right is not acquired, the terminal 100 goes to the operation of step S109. On the other hand, when the access right is acquired, the substitute frame issuance portion 109 creates a substitute frame which is the same as or equivalent to the immediately previous control frame, based on the control information stored in the control frame memory portion 107 (step S107). The substitute frame issuance portion 109 causes the frame transmission/reception portion 105 to transmit the created substitute frame at predetermined time intervals (typically, time intervals at which a control frame is transmitted), i.e., issues a substitute frame periodically (step S108). Although it is herein assumed that the substitute frame issuance portion 109 creates a substitute frame after the competition process, the competition process may be executed after the substitute frame is created.

As described above, according to the first embodiment, a terminal which functions as a controlled station stores control information contained in a latest control frame. When detecting that a control station is disconnected from a communication system, the terminal creates a substitute frame based on the stored control information and issues the substitute frame periodically. Therefore, even if a control station is disconnected from a communication system, a substitute frame is continued to be periodically issued in place of a control frame on the communication system. Therefore, media access is guaranteed on the communication system without suddenly exchanging with a new control station. As a result, it is possible to avoid a situation that the absence of a control station causes media access to be inefficient for a long time on the communication system. Further, in the first embodiment, communication quality of a whole communication system can be maintained by a considerably simple process, i.e., storing control information and issuing a substitute frame. Thus, the present invention is practically very useful.

In the foregoing description, the operation of the terminal 100 of the first embodiment of the present invention is implemented by executing the substitution control program. Alternatively, the terminal 100 may be constructed by implementing the functional blocks of FIG. 4 using dedicated hardware, each of the functional blocks executing the operation of FIG. 5. In this case, the dedicated hardware may be incorporated in the central processing device 101 or the frame transmission/ reception access processing device 102, or alternatively may be incorporated in other portions of the terminal 100.

Second Embodiment

A terminal according to a second embodiment of the present invention is assumed to function both as a control station and as a controlled station. A terminal which tries to newly participate in a communication system determines whether to operate as a control station or as a controlled station before participating in the communication system.

Figure 6:
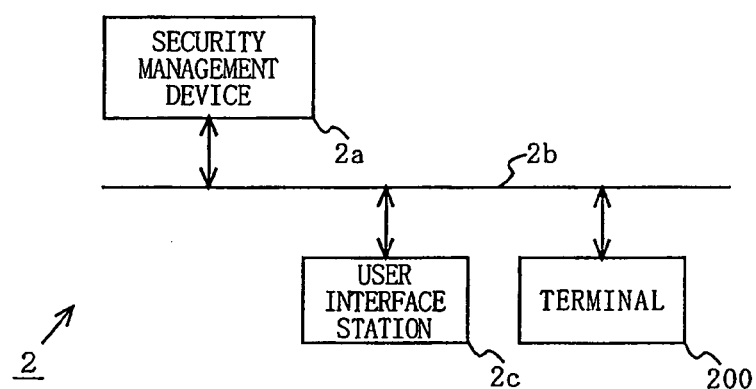
FIG. 6 is a diagram showing a portion of a communication system 2 according to a second embodiment of the present invention.

FIG. 6 is a diagram showing a portion of a communication system 2 of the second embodiment. As shown in FIG. 6, the communication system 2 of the second embodiment is provided with a security management device 2a. The security management device 2a authenticates a terminal 200 which tries to participate in a communication system and manages a cryptographic key for a link between terminals or a cryptographic key for a whole communication system. Note that the security management device 2a may be provided in a control station which issues a control frame.

A user interface station 2c which has a user interface which imparts a certain input means to a user, is connected to the communication system 2. The user interface station 2c may be implemented by a device other than the terminal 200 capable of participating in the communication system 2 or by the terminal 200.

The terminal 200 and the security management device 2a are connected to each other via a communication medium 2b. Note that a whole structure of the communication system 2 is similar to that of the first embodiment, and therefore, FIG. 1 is referenced.

Figure 7:
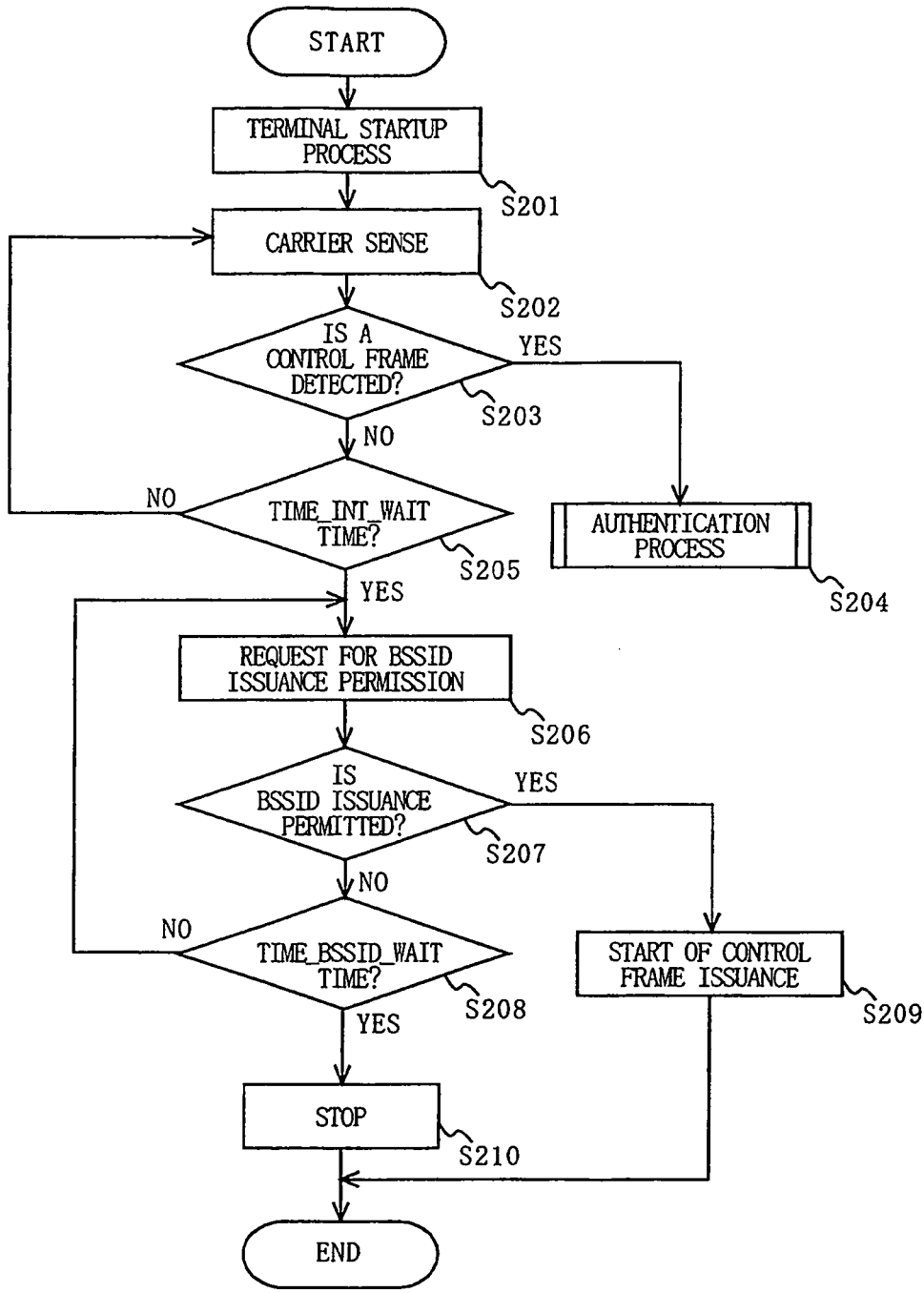
FIG. 7 is a flowchart showing an operation of a terminal 200 when newly participating in the communication system 2.

FIG. 7 is a flowchart showing an operation of the terminal 200 when newly participating in the communication system 2. Hereinafter, the operation of the terminal 200 when newly participating in the communication system 2 will be described with reference to FIG. 7. Note that a hardware structure of the terminal 200 is similar to that of the first embodiment, and therefore, FIG. 3 is referenced. The operation of FIG. 7 may be implemented by the central processing device 101 executing a program stored in the auxiliary memory device 103, or by dedicated hardware.

Initially, the terminal 200 executes a terminal startup process (step S201). Next, the terminal 200 executes carrier sense (step S202). Next, based on the carrier sense, the terminal 200 determines whether or not a control frame is detected (step S203).

In step S203, when a control frame is detected, a control station is already present, and therefore, the terminal 200 communicates with the security management device 2a to execute an authentication process for participating in the communication system 2 (step S204). A terminal which can participate in the communication system 2 should be explicitly permitted for participation. Therefore, the user utilizes the user interface station 2c to input fixed information (serial code) for specifying a terminal which the user wants to participate in the communication system 2. The information is imparted to the security management device 2a. The security management device 2a accumulates the information. In the process of step S204, the terminal 200 which wants to participate in the communication system 2 informs the security management device 2a of a request for participation along with a serial code thereof. In response to this, the security management device 2a checks the serial code. When it can be confirmed that the terminal 200 is permitted for participation by the user, the security management device 2a informs the terminal 200 of information about the cryptographic key, i.e., informs the terminal 200 which wants to participate in the communication system 2 of authentication/permission. On the other hand, when the informed serial code cannot be found among the accumulated serial codes, the security management device 2a refuses participation of the terminal 200 which wants to participate in the communication system 2. Note that a process for authenticating participation of a new entrant terminal is not limited to the example described above. For example, a new entrant terminal may be authenticated for precipitation only when a button or the like is provided in a user interface station and an authentication request can be received during a certain valid time period from the time when the button is pressed down.

In step S203, when a control frame is not detected, the terminal 200 determines whether or not a TIME_INT_WAIT time is elapsed (step S205). The TIME_INT_WAIT time is a predetermined transmission time interval of a control frame. When the TIME_INT_WAIT time is not elapsed, the terminal 200 returns to the operation of step S202. On the other hand, when the TIME_INT_WAIT time is elapsed, the terminal 200 goes to an operation of step S206 which is a process in which the terminal 200 itself is started up as a control station.

In step S206, the terminal 200 requests a station which is only one that has a function (BSSID manager) of permitting issuance of an ID of a communication system (hereinafter referred to as a BSSID) for the user, for issuance of a BSSID, in order to obtain the BSSID. An effective time during which permission of BSSID issuance can be requested is a TIME_B-SSID_WAIT time. The BSSID manager function may be possessed by the user interface station 2c. The BSSID manager executes management for causing a BSSID to be only one that is effective on a time axis in a logical communication system which is desired by the user. In response to the BSSID issuance permission request, the BSSID manager permits issuance of a BSSID unless an effective BSSID is present at the time of the request.

After step S206, the terminal 200 determines whether or not issuance of a BSSID is permitted (step S207). When issuance of a BSSID is permitted, the terminal 200 sets the BSSID by itself or is informed of issuance of the BBSID by the BSSID manager, to use the BSSID to start issuance of a control frame (step S209).

On the other hand, in step S207, when it is determined that issuance of a BSSID is not permitted, the terminal 200 determines whether or not the TIME_BSSID_WAIT time is elapsed (step S208). When the TIME_BSSID_WAIT time is not elapsed, the terminal 200 returns to the operation of step S206 and requests for issuance of a BSSID. On the other hand, when the TIME_BSSID_WAIT time is elapsed, the terminal 200 stops the operation (step S210). Note that the process of FIG. 7 may be repeated a plurality of times.

As described above, by activating a control station, the communication system is started up.

The control station of the second embodiment previously selects a candidate terminal which transmits a substitute frame, and gives a priority to the candidate terminal.

FIG. 8 is a flowchart showing an operation of a control station. Hereinafter, the operation of the control station will be described with reference to FIG. 8.

Initially, the control station selects a candidate terminal which issues a substitute frame (step S301). A criterion for selecting a candidate is not particularly limited. For example, a terminal which has a location or performance suitable as a control station may be selected as a candidate terminal, or a terminal which is previously registered may be selected as a candidate terminal. The control station may collect information about a communication state of each terminal as statistical information, and based on the collected statistical information, may select a candidate terminal.

Next, the control station gives a priority to the candidate terminal (step S302). A criterion for giving a priority is not particularly limited. For example, a priority is given, depending on the processing performance of a terminal, or may be randomly given without considering the processing performance. The control station may inform of a priority which is stored in a dedicated frame or is described in a control frame.

Next, the control station transmits control required information and a priority to the candidate terminal and informs that the terminal is a candidate terminal (step S303). As used herein, the control required information refers to information which is required to operate as a control station. Control information contained in a control frame is a portion of control required information.

Figure 9:
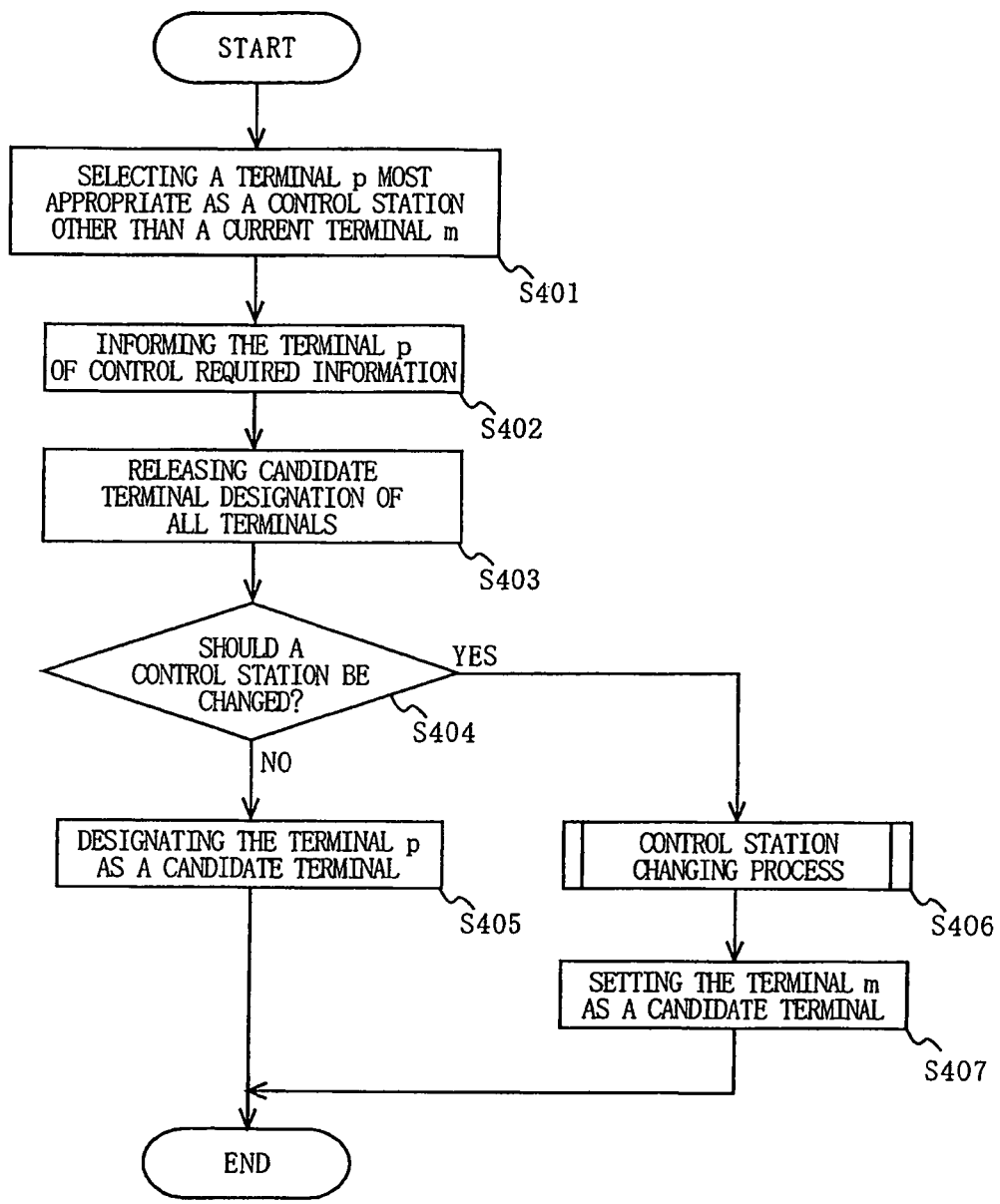
FIG. 9 is a flowchart showing an exemplary operation of a control station.

FIG. 9 is a flowchart showing an exemplary operation of a control station. Hereinafter, an example of selection of a candidate terminal will be described with reference to FIG. 9. In FIG. 9, a terminal which is currently operating as a control station is indicated by m.

Initially, the terminal m which is a control station selects a terminal p which is most appropriate to a control station, other than the terminal m, based on communication quality information of a communication system (step S401). As used herein, the communication quality information refers to information which indicates communication quality of a terminal on a communication system.

Next, the terminal m which is a control station informs the selected terminal p of information which is possessed by the terminal m and is required to function as a control station (control required information) (step S402). For example, the control required information includes information about a reserved band requested by each station in a communication system and a request station, information for identifying a port in use or a transmission queue, and information about a traffic situation of a communication system.

Figure 10:
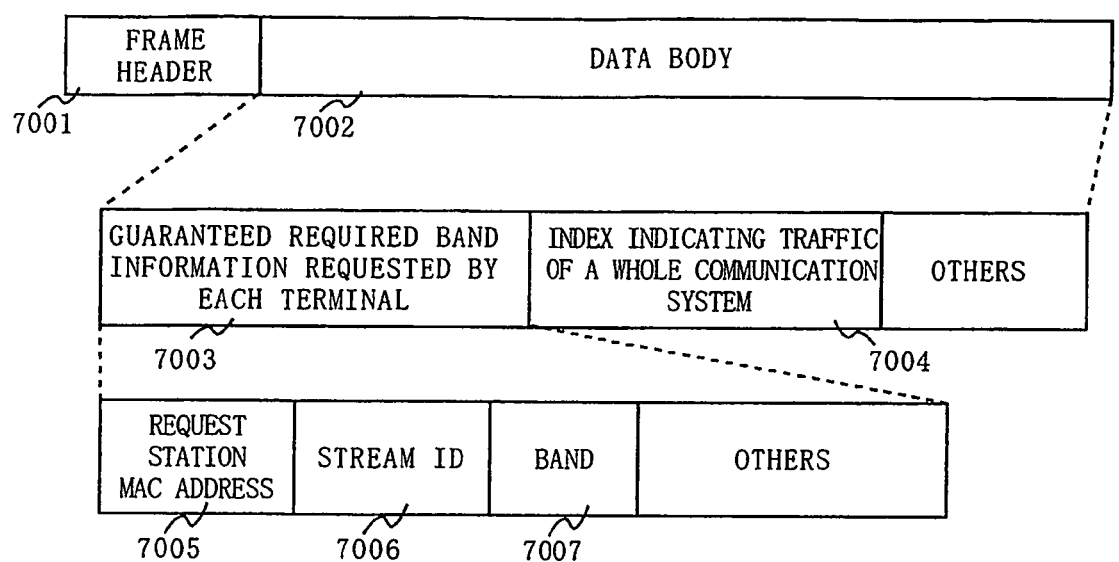
FIG. 10 is a diagram showing an exemplary form of a frame when informing control required information.

FIG. 10 is a diagram showing an exemplary form of a frame when informing control required information. The frame includes a frame header 7001 and a frame body 7002. The frame body 7002 includes a field 7003 and a field 7004. The field 7003 is a field in which, when a band guarantee request is made by a terminal in a communication system containing a control station in order to transmit specific stream contents, the control station accepts the request, and there is a link whose band is guaranteed, information about the band is described. The field 7004 is a field in which information (index) about traffic (congestion level) of a whole communication system is described. The field 7003 includes a field 7005, a field 7006, and a field 7007. The field 7005 is a field which indicates an MAC address of a request station which requests for band allocation in a link guaranteed with a band. The field 7006 is a field which indicates information (stream ID) for specifying a transmission queue of the request station. The field 7007 is a field which indicates information about a band for which a request is accepted. Note that a minimum band, an average band, a maximum band, a delay limit, a jitter limit, or the like may be described in the field 7007. When there are a plurality of terminals to which bands are allocated, the data body 7002 includes a plurality of fields 7003.

After step S402, the terminal m as a control station requests all terminals in the communication system 2 for release of designation as a candidate terminal (step S403). Note that it may be defined that when one terminal in the communication system 2 is designated as a candidate terminal and other terminals are informed of control required information, the designation of the one terminal as a candidate terminal may be released.

Next, the terminal m which is a control station determines whether or not to change control stations by transferring the function of a control station to the terminal p (step S404). A criterion for determining whether or not to change control stations is not particularly limited. For example, when the terminal p receives a signal from other terminals better than from the terminal m, the terminal m determines to change control stations.

When it is determined not to change control stations, the terminal m which is a control station designates the terminal p as a candidate terminal for a control station (step S405). Note that when the terminal m which is a control station transmits control required information to the terminal p, an intention to designate the terminal p as a candidate terminal may be described in the control required information. In this manner, when one terminal is designated as a candidate terminal and a control station then designates another terminal as a candidate terminal, the designation of the one terminal as a candidate terminal is released.

On the other hand, when it is determined to change control stations, the terminal m which is the control station executes a process for causing the terminal p to become a control station in place of the terminal m (step S406). After changing the control station, the terminal p which is a new control station creates a control frame or controls media access in response to requests from other terminals, based on control required information imparted from the terminal m.

After step S406, the terminal m sets itself to be a candidate terminal (step S407).

Thus, when the communication system 2 has a function of changing control stations, a candidate terminal may be determined based on whether or not to change control stations.

Figure 11:
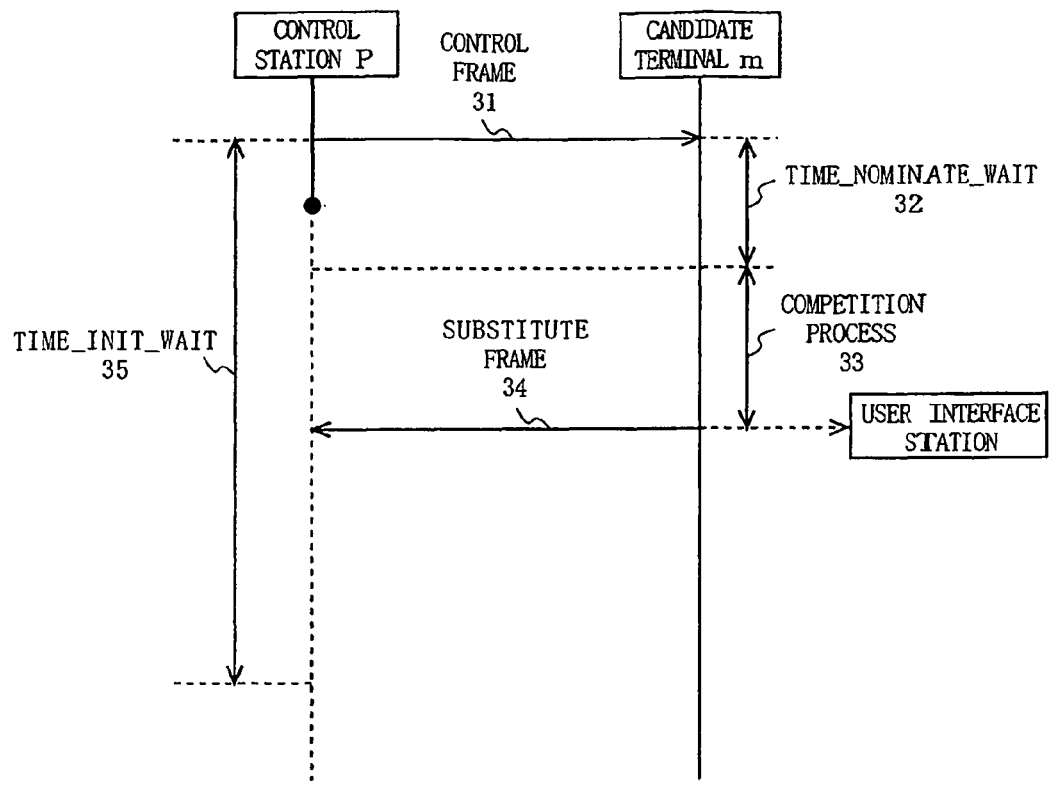
FIG. 11 is a timing chart showing a flow of a terminal m issuing a substitute frame, assuming that a terminal p is disconnected from the communication system 2.

After the process of FIG. 9, it is currently assumed that the terminal p is a control station while the terminal m is a candidate terminal. FIG. 11 is a timing chart showing a flow of the terminal m issuing a substitute frame, assuming that the terminal p is disconnected from the communication system 2.

The controlled terminal of the second embodiment stores control information contained in a control frame issued by a control station as does the controlled terminal of the first embodiment.

It is assumed that the terminal p which is a control station issues a control frame 31, and thereafter, is disconnected from the communication system 2 without issuing a next control frame.

When a TIME_NOMINATE_WAIT time (first time period) 32 is elapsed from a time of detection of the control frame 31 issued by the terminal p, the terminal m which is a candidate terminal recognizes that the control station is disconnected from the communication system 2. On the other hand, when a TIME_INIT_WAIT time (first time period) 35 is elapsed from the time of detection of the control frame 31, a non-candidate terminal recognizes that the control station is disconnected from the communication system 2. The TIME_INIT_WAIT time is longer than the TIME_NOMINATE_WAIT time. In other words, a first time period which is used by a terminal designated as a candidate terminal is shorter than a first time period which is used by a terminal not designated as a candidate terminal. Note that the first time period may be defined using the number of frames counted, as in the first embodiment.

When recognizing that the control station is disconnected from the communication system 2, the terminal m uses the stored control information to create a substitute frame and executes a competition process 33 for communication medium so as to issue the substitute frame.

After the competition process 33, when acquiring an access right, the terminal m transmits a substitute frame 34.

Figure 12:
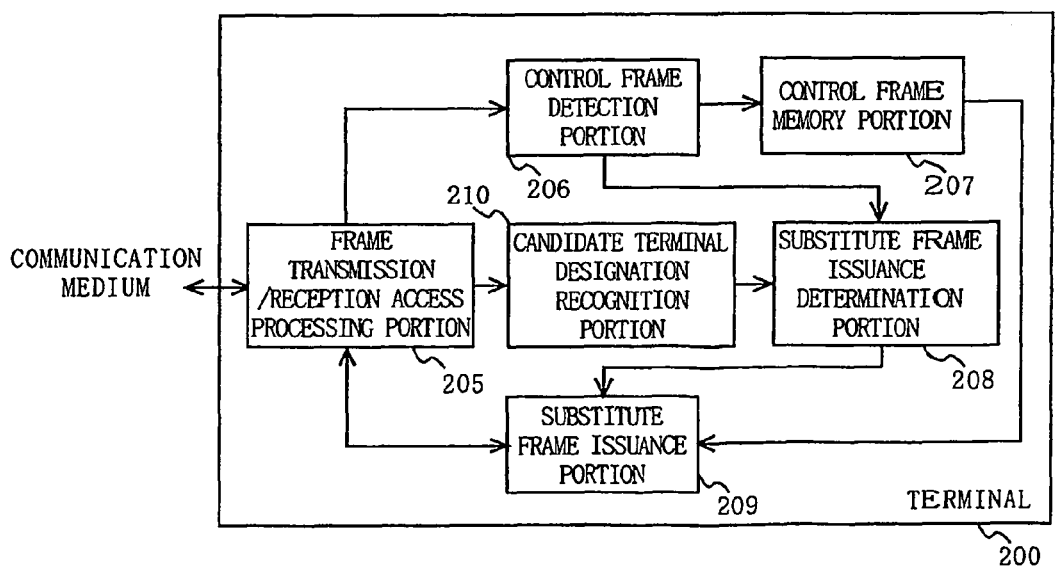
FIG. 12 is a block diagram showing a functional structure of the terminal 200 of the second embodiment when the substitution control program is executed.

FIG. 12 is a block diagram showing a functional structure of the terminal 200 of the second embodiment when the substitution control program is executed. In FIG. 12, the terminal 200 comprises a frame transmission/reception portion 205, a control frame detection portion 206, a control frame memory portion 207, a substitute frame issuance determination portion 208, a substitute frame issuance portion 209, and a candidate terminal designation recognition portion 210.

The frame transmission/reception portion 205 transmits/receives a frame to/from a communication medium. The frame transmission/reception portion 205 transfers the received frame to the control frame detection portion 106, the candidate terminal designation recognition portion 210, and the substitute frame issuance portion 209.

The control frame detection portion 206 has a function similar to that of the control frame detection portion 106 of the first embodiment. The control frame memory portion 207 has a function similar to that of the control frame memory portion 107 of the first embodiment.

The candidate terminal designation recognition portion 210 recognizes whether or not the terminal 200 is designated as a candidate terminal by a control station. When terminal 200 is designated as a candidate terminal, the candidate terminal designation recognition portion 210 memorizes the designation as a candidate terminal and a priority thereof.

The substitute frame issuance determination portion 208 references contents stored in the candidate terminal designation recognition portion 210 to determine whether or not the terminal 200 is designated as a candidate terminal. When the terminal 200 is designated as a candidate terminal, the substitute frame issuance determination portion 208 determines whether or not a current control station is disconnected from the communication system 1, thereby determining whether or not to issue a substitute frame. A method for determining whether or not to issue a substitute frame is similar to that of the substitute frame issuance determination portion 108 in the first embodiment.

When it is determined that the substitute frame issuance determination portion 208 should issue a substitute frame, the substitute frame issuance portion 209 creates a frame which is the same as or equivalent to a control frame issued by the control station, as a substitute frame, based on control information stored in the control frame memory portion 207. Note that the substitute frame issuance portion 209 may create a substitute frame using control required information which has been previously received from the control station.

Figure 13:
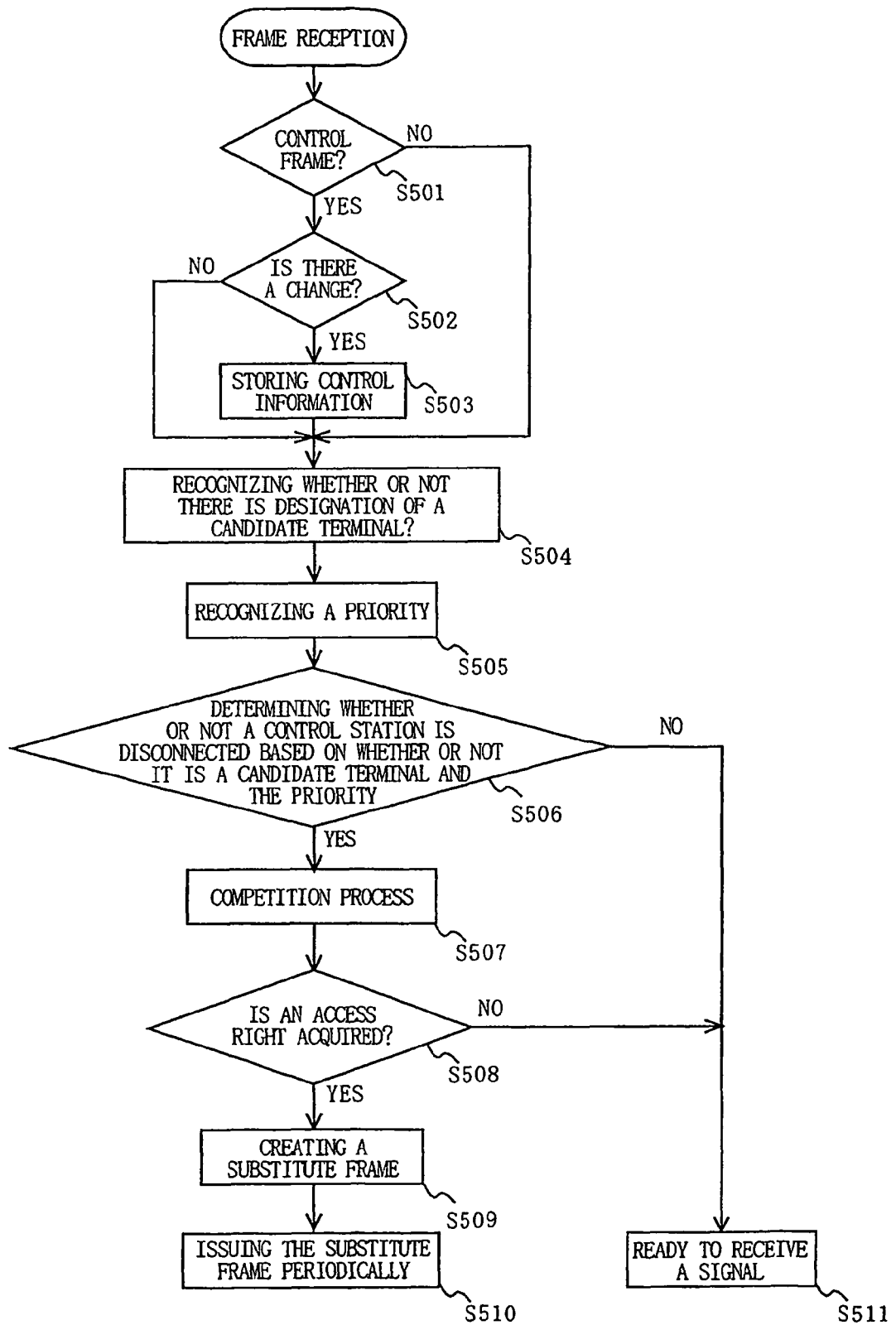
FIG. 13 is a flowchart showing an operation of the terminal 200 when a substitution control program is executed.

FIG. 13 is a flowchart showing an operation of the terminal 200 when the substitution control program is executed. Hereinafter, the operation of the terminal 200 when the substitution control program is executed will be described with reference to FIG. 13. Note that a main body of the operation of FIG. 13 is similar to that of the first embodiment.

The operation of FIG. 13 is started by frame reception by the terminal 200 as a trigger. Operations of steps S501 to S503 are similar to steps S101 to S103 are similar to those of the first embodiment.

In step S504, the substitute frame issuance determination portion 208 determines whether or not the terminal 200 is designated as a candidate terminal with reference to the candidate terminal designation recognition portion 210. Next, the substitute frame issuance determination portion 208 recognizes a priority as a candidate terminal (step S505). Next, the substitute frame issuance determination portion 208 determines whether or not the control station is disconnected from the communication system based on whether or not the terminal 200 is a candidate terminal (step S504) and the priority recognized in step S505 (step S506). Note that the determination of step S506 is always performed, and when it is determined that the control station is disconnected from the communication system 2, the terminal 200 performs an interrupt process to execute operations of steps S507 to S510 no matter whether or not a frame is received.

There are various methods for determining whether or not a control station is disconnected, based on whether or not a terminal is a candidate terminal and a priority.

For example, as in FIG. 11 described above, when a first time period (TIME_NOMINATE_WAIT time) is elapsed, a candidate terminal determines that a control station is disconnected from a communication system. In this case, the first time period is such that if a control frame is not received during this period, it is determined that the control station is disconnected. On the other hand, when a first time period (TIME_INIT_WAIT time) which is long than the first time period of the candidate terminal is elapsed, a terminal other than the candidate terminal determines that the control station is disconnected from the communication system. As a result, the candidate terminal transmits a substitute frame with a higher probability than that of a terminal(s) other than the candidate terminal. Further, the length of the first time period may be changed, depending on the priority. Specifically, the first time period in a candidate terminal having a high priority may be set to be shorter than the first time period of a candidate terminal having a low priority. In this case, a candidate terminal having a high priority transmits a substitute frame with a high probability.

In step S506, when determining that the control station is not disconnected, the terminal 200 becomes ready to receive a signal (step S511). When receiving a new frame, the operation of step S501 and thereafter are started.

In step S506, when the control station is disconnected, the substitute frame issuance portion 209 executes a competition process for access to a communication medium (step S507). Note that a candidate terminal having a higher priority may acquire an access right with a higher probability in the competition process of step S507.

Figure 14:
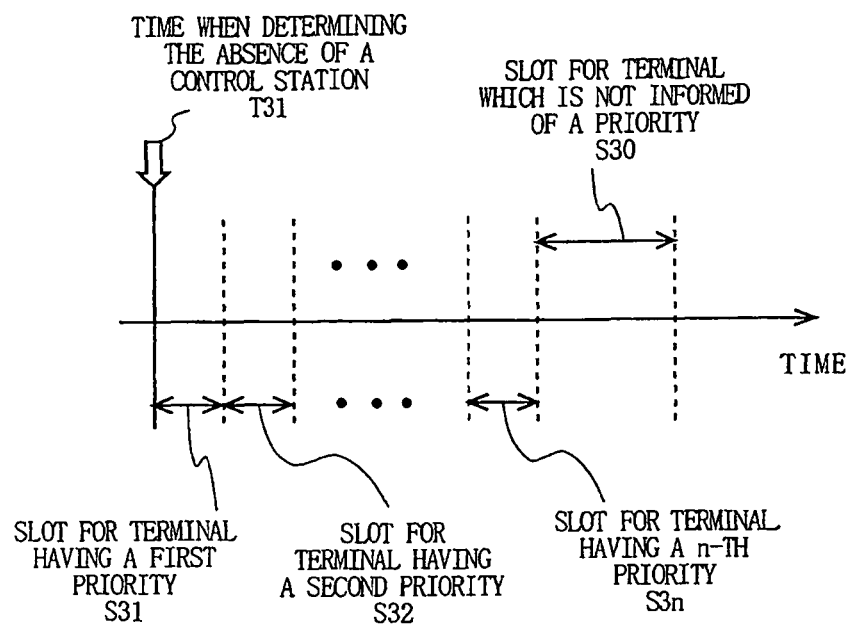
FIG. 14 is a diagram showing transmission slots for a substitute frame which depend on priorities of candidate terminals.

For example, by previously determining a slot in which a substitute frame is transmitted, depending on the priority of a candidate terminal, a candidate terminal having a higher priority acquires an access right with a higher probability. FIG. 14 is a diagram showing transmission slots for a substitute frame which depend on the priorities of candidate terminals. As shown in FIG. 14, slots S31, S32, . . . , S3n for transmitting a substitute frame are allocated successively, depending on the priority, from time T31 when the absence of a control station is determined. The slot S30 for transmitting a substitute frame is allocated at an end for a terminal which is not informed of a priority. A candidate terminal transmits a substitute frame using a slot allocated depending on the priority. By using such a slot, a candidate terminal having a higher priority acquires an access right with a higher probability and can issue a substitute frame earlier. According to the scheme of FIG. 14, collision of substitute frames can be reliably avoided, and even when the information of a priority or the like is incomplete, a substitute frame can be transmitted. Note that the scheme includes a method of specifying only a single terminal having a highest priority and issuing a substitute frame from a dedicated slot.

Note that by defining the width of a contention window based on the priority, a terminal which is given a higher priority can be caused to acquire an access right to transmit a substitute frame, with a higher probability. For example, time is divided into unit intervals in each of which is required for frame detection on media. Such a unit is here called a slot. A random number is calculated where its maximum is a predetermined number of slots (here called a contention window). Transmission is performed after waiting until a time corresponding to the calculated number of slots is elapsed (a general access control). In this case, if a terminal having a higher priority has a smaller width of the contention window, the probability of acquisition of an access right to transmit a substitute frame can be increased.

After step S507, the substitute frame issuance portion 209 determines whether or not an access right to transmit a substitute frame is acquired as a result of a competition process (step S508). When the access right is not acquired, the terminal 200 goes to an operation of step S511. On the other hand, when the access right is acquired, the substitute frame issuance portion 209 creates a substitute frame which is the same as or equivalent to an immediately previous control frame, based on control information stored in the control frame memory portion 207 (step S509). The substitute frame issuance portion 209 causes the frame transmission/reception portion 205 to transmit the created substitute frame at predetermined time intervals (typically, time intervals at which a control frame is transmitted) to issue a substitute frame periodically (step S510). Although it is herein assumed that the substitute frame issuance portion 209 creates a substitute frame after a competition process, the competition process may be executed after the substitute frame is created.

As described above, according to the second embodiment, a terminal which functions as a controlled station stores control information contained in a latest control frame. A control station previously selects a candidate terminal which issues a substitute frame and gives a priority thereto. The terminal which functions as a controlled station determines whether or not the control station is disconnected from a communication system, based on the presence or absence of designation of a candidate terminal and the priority. When the control station is disconnected from the communication system, the terminal which functions as a controlled station creates a substitute frame based on the stored control information and issues the substitute frame periodically. Therefore, even when the control station is disconnected, a substitute frame is periodically issued instead of a control station on the communication system. Therefore, media access is guaranteed on the communication system without suddenly exchanging with a new control station. By using a candidate terminal and a priority, it is possible to, after a control station is disconnected, obtain high communication quality within a currently feasible range. Further, since the probability that a substitute frame is transmitted from a candidate terminal is increased, a substitute frame is transmitted from a terminal which is appropriate to transmission of the substitute frame. As a result, media access of a communication system can be prevented from falling into an inefficient situation for a long time due to the absence of a control station.

Note that the candidate terminal may only memorize that it is a candidate terminal and may not be given a priority.

In the second embodiment, a competition process is executed so as to obtain an opportunity to issue a substitute frame. Alternatively, instead of a competition process, a terminal may issue a substitute frame immediately after determining that a control station is disconnected from a communication system. Still alternatively, a terminal may issue a substitute frame with timing with which a control frame is originally transmitted.

Note that a station which stores a state of a communication system in a non-volatile ROM (flash ROM) (a station having a system backup function) may be present in the communication system. The non-volatile ROM may be any memory device which can hold information after being powered off. The non-volatile ROM stores an index capable of identifying a station which is authenticated by a security manager to be able to participate in the communication system; an index capable of identifying a control station in the communication system; an index capable of identifying a station having the security manager function; and the like. When one or more stations are disconnected from the communication system or are powered off for some reason, information written in the non-volatile ROM of a station having the system backup function is utilized to recover the communication system. The information written in the non-volatile ROM is used in selection of a control station and a security manager when a station in the communication system is started up again. Also in the authentication task of the security management device 2a in step S204, the information written in the non-volatile ROM is utilized. Specifically, the security management device 2a performs authentication based on the information written in the non-volatile ROM without the user's reconfirmation.

Note that a terminal having such a non-volatile ROM may be a terminal having the BSSID manager function.

Third Embodiment

A whole structure of a communication system according to a third embodiment of the present invention is similar to that of the first embodiment, and therefore, FIG. 1 is referenced. In the third embodiment, each terminal starts up either as a control station or as a controlled station. Note that the communication system may include a terminal which starts up only as a control station and a terminal which starts up only as a controlled station.

A hardware structure of a terminal of the third embodiment is similar to that of the first embodiment, and therefore, FIG. 3 is referenced.

Figure 15:
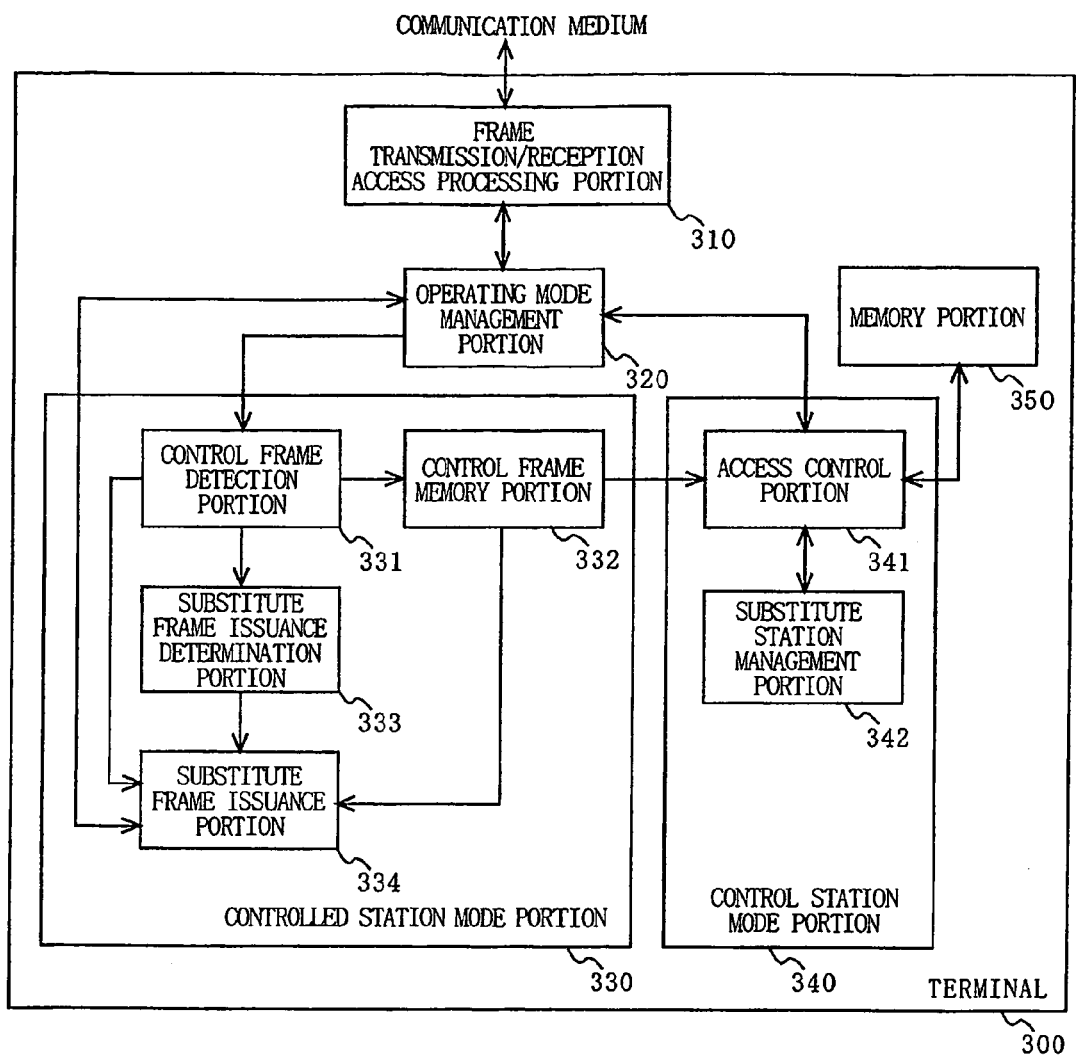
FIG. 15 is a block diagram shows a functional structure of a terminal 300 of a third embodiment according to the present invention when executing a substitution control program.

FIG. 15 is a block diagram showing a functional structure of a terminal 300 of the third embodiment when executing a substitution control program. In FIG. 15, the terminal 300 comprises a frame transmission/reception portion 310, an operating mode management portion 320, a controlled station mode portion 330, and a control station mode portion 340.

The frame transmission/reception portion 310 is an interface to a communication medium. When receiving a frame, the frame transmission/reception portion 310 transfers the frame to the operating mode management portion 320.

The operating mode management portion 320 manages whether or not the operating mode of the terminal 300 is a control station mode or a controlled station mode. When a terminal is operating, one of the modes is selected. The controlled station mode portion 330 and the control station mode portion 340 are connected to the operating mode management portion 320. The terminal 300 uses the controlled station mode portion 330 or the control station mode portion 340 in accordance with the operating mode managed by the operating mode management portion 320.

The controlled station mode portion 330 comprises a control frame detection portion 331, a control frame memory portion 332, a substitute frame issuance determination section 333, and a substitute frame issuance portion 334. When the operating mode is the controlled station mode, the operating mode management portion 320 transfers a frame from the frame transmission/reception portion 310 to the control frame detection portion 331.

The control frame detection portion 331 determines whether or not the frame from the operating mode management portion 320 is a control frame, and when it is a control frame, causes the control frame memory portion 332 to store information (control information) contained in the control frame.

The control frame memory portion 332 stores the control information. Note that, as in the first embodiment, only control information contained in a latest control frame may be stored in the control frame memory portion 332.

The substitute frame issuance determination section 333 starts up a timer (not shown) every time a control frame is detected, to monitor intervals at which a control station issues a control frame. The substitute frame issuance determination section 333 monitors the control frame interval to determine the presence or absence of a control frame which is expected to be issued for a predetermined time period. When a control frame is not issued, i.e., the timer is started up, for a predetermined time interval or more, the substitute frame issuance determination section 333 determines that the control station is disconnected from the communication system. Note that the substitute frame issuance determination portion 333 may comprise a mechanism which starts up a counter for monitoring the number of received frames and resets the counter every time a control frame is detected. In this case, when the counter reaches its maximum count, the substitute frame issuance determination portion 333 determines that the control station is disconnected from a communication system. The predetermined time period or the maximum value of the counter is a first time period.

When the substitute frame issuance determination section 333 determines that the control station is disconnected from the communication system, the substitute frame issuance portion 334 creates a substitute frame using the control information stored in the control frame memory portion 332 and executes a competition process via the operating mode management portion 320 and the frame transmission/reception portion 310. When acquiring an access right, the substitute frame issuance portion 334 transfers a substitute frame to the operating mode management portion 320, which in turn transmits the substitute frame via the frame transmission/reception portion 310 to a communication medium. Thereafter, the substitute frame issuance portion 334 issues the substitute frame periodically. When the terminal 300 receives a frame from another terminal while the substitute frame issuance portion 334 is issuing the substitute frame, the substitute frame issuance portion 334 determines whether or not the frame is a frame from a terminal which is a control station. When the frame is a frame from a terminal which is a control station, the substitute frame issuance portion 334 stops transmitting the substitute frame. When a time for waiting for recovery of a control station (second time period) is elapsed, the substitute frame issuance portion 334 instructs the operating mode management portion 320 to switch the mode so that the terminal 300 operates as a control station. In response to this, the operating mode management portion 320 switches the operating mode.

The control station mode portion 340 comprises an access control portion 341 for scheduling media access of a terminal in a communication network, which is a key function of a control station, and a substitute station management portion 342. Note that the substitute station management portion 342 may not be included.

The access control portion 341 collects a frame issuance request from other terminal(s) operating in the controlled station mode in the communication system, and a frame issuance request in the terminal 300 and allocates a transmission resource of a communication medium to the other terminal(s) or the terminal 300 in a time-division or frequency-division manner. Information about the allocation of the transmission resource is stored as scheduling information in a control frame. The access control portion 341 issues the control frame periodically. Such a centralized media access control can prevent collision of frames on a network in media in which collision detection is difficult, thereby, for example, making it possible to guarantee transmission quality required for the network without reducing the use efficiency of the media.

The substitute station management portion 342 previously sets and manages a candidate terminal which issues a substitute frame. A method for selecting a candidate terminal is similar to that of the second embodiment.

A memory portion 350 is a non-volatile memory device which is connected to the access control portion 341. The memory portion 350 stores a request for acquisition of a transmission resource from a terminal on a network, and information about updating of scheduling information, such as allocation, change and erase of a transmission band depending on a state of a transmission channel. The memory portion 350 does not lose the stored information even when the power source of the terminal 300 is suddenly interrupted. Therefore, when a terminal which has been disconnected from a communication system is recovered and started up as a control station, the terminal can reference to the information stored in the memory portion 350 to obtain information required as a control station. Note that the memory portion 350 may not be provided.

Hereinafter, an operation of each terminal when a communication system operates normally will be described with reference to FIG. 1.

It is assumed that, currently, the terminal A operates as a control terminal while the terminals B, C and D operate as controlled terminals in the communication system. The terminal A issues a control frame periodically. In the control frame, access scheduling information about access to a communication medium is described. The terminals B, C and D access the communication medium in accordance with the access scheduling information described in the control frame. As a result, collision is prevented, and effective use of a network resource and guarantee of requested quality are achieved.

Figure 16:
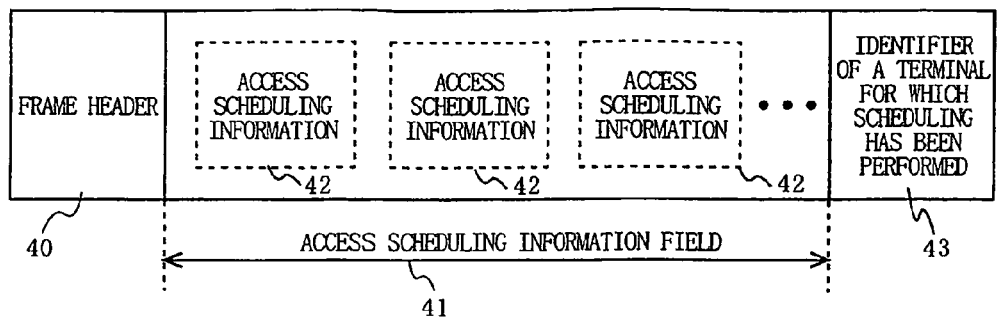
FIG. 16 is a diagram showing an exemplary format of a control frame (substitute frame).

FIG. 16 is a diagram showing an exemplary format of a control frame (substitute frame). As shown in FIG. 16, the control frame comprises a frame header 40, an access scheduling information field 41, and a field 43. The frame header 40 is provided to all frames issued in the communication system. The frame header 40 includes an identifier for a destination or sender terminal of a frame, a frame type, encryption information, and the like. The access scheduling information field 41 includes access scheduling information 42 which is scheduled by the access control portion 341. The access scheduling information 42 is composed of designation of a terminal, a data stream, a transmission resource request, an access protocol (priority assignment by time division or frequency division, a competition-based access scheme in compliance with the CSMA/CA scheme, etc.). The access scheduling information field 41 is composed of the access scheduling information 42 of each data stream, for example. The field 43 includes an identifier for a terminal which has executed access scheduling. It is herein assumed that the terminal A is a control station. Therefore, the field 43 stores an identifier for the control station A. A format of a substitute frame is as shown in FIG. 16, and information stored in the substitute frame is the same as that of a control frame. Therefore, the field 43 of the substitute frame stores the identifier for the terminal A without modification.

The control frame issued by the control station A is received by a controlled station. The frame transmission/reception portion 310 of the controlled station transfers the received control frame to the operating mode management portion 320. The operating mode of the controlled station is the controlled station mode, and therefore, the operating mode management portion 320 transfers the received control frame to the control frame detection portion 331. Thereafter, the control information contained in the control frame (in the example of FIG. 16, the information described in the frame header 40, information described in the access scheduling information field 41, and information described in the field 43) is stored in the control frame memory portion 332. Note that past control information may be overwritten in the storing process. In addition, every time receiving a control frame, the substitute frame issuance determination section 333 starts up a timer (not shown) and determines whether or not the control station is disconnected from the communication system. A time for the determination (an expiration time of the timer) is preferably set to be slightly longer than the control frame issuance interval.

Figure 17:
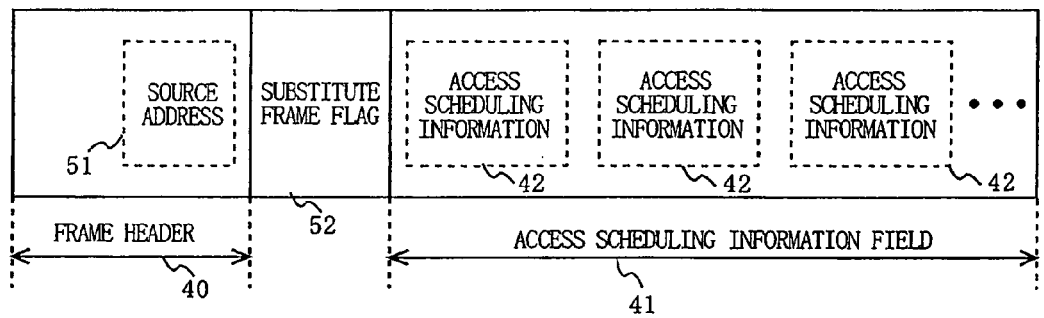
FIG. 17 is a diagram showing another exemplary format of a control frame (substitute frame).

FIG. 17 is a diagram showing another exemplary format of a control frame (substitute frame). As shown in FIG. 17, a control frame (substitute frame) comprises a frame header 40, a substitute frame flag 52, and an access scheduling information field 41. The frame header 40 and the access scheduling information field 41 of the substitute frame are completely the same as the frame header 40 and the access scheduling information field 41 of the control frame. The control frame and the substitute frame are different from each other only in information stored in the substitute frame flag 52. Therefore, when the format of FIG. 17 is used, the substitute frame is considered to be equivalent to the control frame.

In FIG. 17, the frame header 40 is assumed to include a source address 51. The source address is also contained in the frame header of the control frame. The source address of the control frame is an identifier for the terminal A. The source address of the frame header of the substitute frame is the same as the source address contained in the frame header of the control frame. In other words, a terminal which transmits the substitute frame is other than the terminal A, however, the source address contained in the substitute frame is the identifier for the terminal A.

The substitute frame flag 52 is false when the frame is a control frame and true when the frame is a substitute frame. Note that only a substitute frame may include a substitute frame flag while a control frame may not include a substitute frame flag.

It is here assumed that the power source of the terminal A is interrupted for some reason, so that the terminal A is disconnected from the communication system. As a result, a control frame is no longer issued. Since a control frame is not issued, a controlled station cannot determine an opportunity to access to a communication medium. Note that since the control frame memory portion 332 of the terminal 300 stores latest control information, the terminal 300 may determine an opportunity to access to the communication medium several times based on the control information stored in the control frame memory portion 332. Thus, the terminal 300 may comprise a means for trying to access to a communication medium in accordance with control information contained in the previously received control frame even if a control frame cannot be received. Such a means can guarantee media access even when a control frame is normally issued, however, is not normally received due to a fluctuation in a transmission channel or the like.

When the first time period is elapsed after a control frame is no longer received, the substitute frame issuance determination section 333 determines to issue a substitute frame.

A procedure for issuing a substitute frame may be the procedure of the first embodiment, or alternatively, a procedure in which a candidate terminal has a priority to issue a substitute frame as in the second embodiment.

The substitute frame issuance portion 334 references latest control information from the control frame memory portion 332 to create a substitute frame. The substitute frame issuance portion 334 transfers the created substitute frame to the frame transmission/reception portion 310. The frame transmission/reception portion 310 executes a competition process in accordance with a predetermined procedure, and when win the competition, transmits a substitute frame.

The competition process is executed by, for example, random backoff based on carrier sense.

Figure 18:
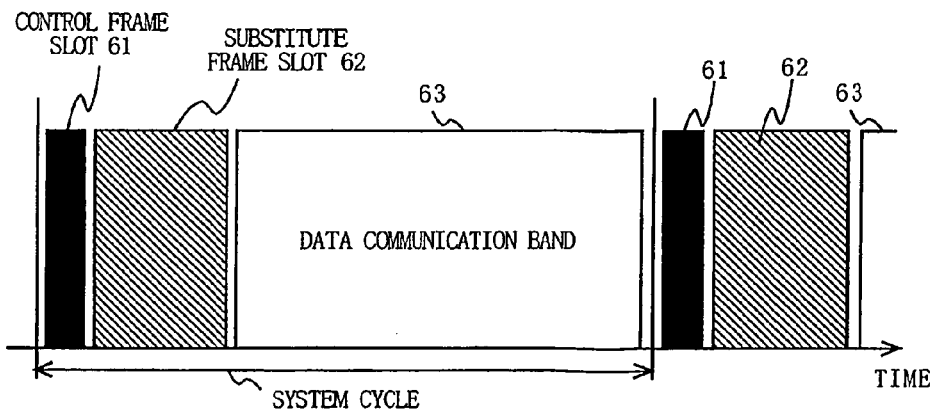
FIG. 18 is a diagram showing a band which is allocated for frame transmission.

In this case, collision between substitute frames may not be detected. Therefore, a band for a substitute frame may be prepared. FIG. 18 is a diagram showing a band which is allocated for frame transmission. As shown in FIG. 18, a control frame slot 61 is allocated for each system cycle. The control frame slot 61 is a band in which only a control frame is issued. After the control frame slot 61, a substitute frame slot 62 is allocated. In the substitute frame slot 62, a substitute frame is issued by random backoff based on carrier sense. A band 63 is for data communication. By exclusively preparing the control frame slot 61 and the substitute frame slot 62 in all system cycles, it is unlikely that collision occurs successively many times so that the performance of the communication system itself is significantly reduced, even though substitute frames may collide several times.

The controlled station mode portion 330 of the terminal 300 may be provided with the candidate terminal designation recognition portion 210 as in the second embodiment. The substitute frame issuance determination section 333 may determine whether or not a control station is disconnected from a communication system, based on whether or not the terminal is a candidate terminal, and the priority, as in the second embodiment. The substitute frame issuance portion 334 may execute a competition process based on the priority.

The frame transmission/reception portion 310 returns a result (success or failure) of issuance of a substitute frame via the operating mode management portion 320 to the substitute frame issuance portion 334. For example, when another terminal has succeeded in issuing a substitute frame earlier than the terminal to which the frame transmission/reception portion 310 is included, the frame transmission/reception portion 310 returns the failure of issuance of a substitute frame to the substitute frame issuance portion 334 without transmitting a substitute frame. When the failure is returned, the substitute frame issuance portion 334 stops issuance of a substitute frame. Thereby, a sequence for issuance of a substitute frame is ended.

It is here assumed that a message indicating that issuance of a substitute frame is succeeded is input to the substitute frame issuance portion 334. The substitute frame issuance portion 334 continues to issue a substitute frame in accordance with transmission frame cycles for a predetermined time TIME_TENT or a predetermined number of times CNT_TENT. The predetermined time TIME_TENT or a time period corresponding to the predetermined number of times CNT_TENT is a second time period. In this case, an identifier for the terminal A which is a control station is described in the field 43 of a substitute frame thus issued. An identifier for a terminal which issues the substitute frame is not described in the field 43. Note that an identifier for a substitute frame is described in the frame header 40 of the substitute frame. Therefore, if the terminal A which was a control station is subsequently recovered, it can be recognized that a frame transmitted at control frame cycles is a substitute frame.

Note that, when a format shown in FIG. 17 is used for a substitute frame, a terminal which issues the substitute frame cannot be identified from information stored in the substitute frame. However, the substitute frame flag 52 describes whether or not the frame is a substitute frame. Therefore, a terminal which receives a substitute frame can recognize whether the frame is a substitute frame or a control frame, by referencing the substitute frame flag 52. When it is recognized that the frame is a substitute frame, it may be defined that a terminal which receives a substitute frame does not request for a control station.

A terminal which issues a substitute frame periodically issues a frame which is the same as or equivalent to a control frame, and does not operate as a control station. In other words, the terminal which issues a substitute frame does not execute band allocation or the like. Therefore, the terminal which issues a substitute frame cannot accept another terminal's request for allocation of a transmission resource. Therefore, the terminal which issues a substitute frame refuses all requests from the other terminals, and creates a refusal response frame indicating refusal of the request and returns the frame to the other terminal. Note that the terminal which issues a substitute frame may ignore all requests and may not return a response. Thus, a function of the terminal which issues a substitute frame is executed in the controlled station mode portion 330, and therefore, the terminal which issues a substitute frame cannot still be said to be a control station. Note that a control station is considered to have various functions, such as acceptance of a new terminal onto a network (authentication, attribution, security setting, etc.). However, the terminal which issues a substitute frame issues a refusal response frame to all request frames directed to a control station.

When the terminal which issues a substitute frame detects a frame transmitted from the terminal A which was a control station while being operating as a substitute control station, the terminal which issues a substitute frame determines that the terminal A is recovered as a control station and stops issuing a substitute frame.

Figure 19:
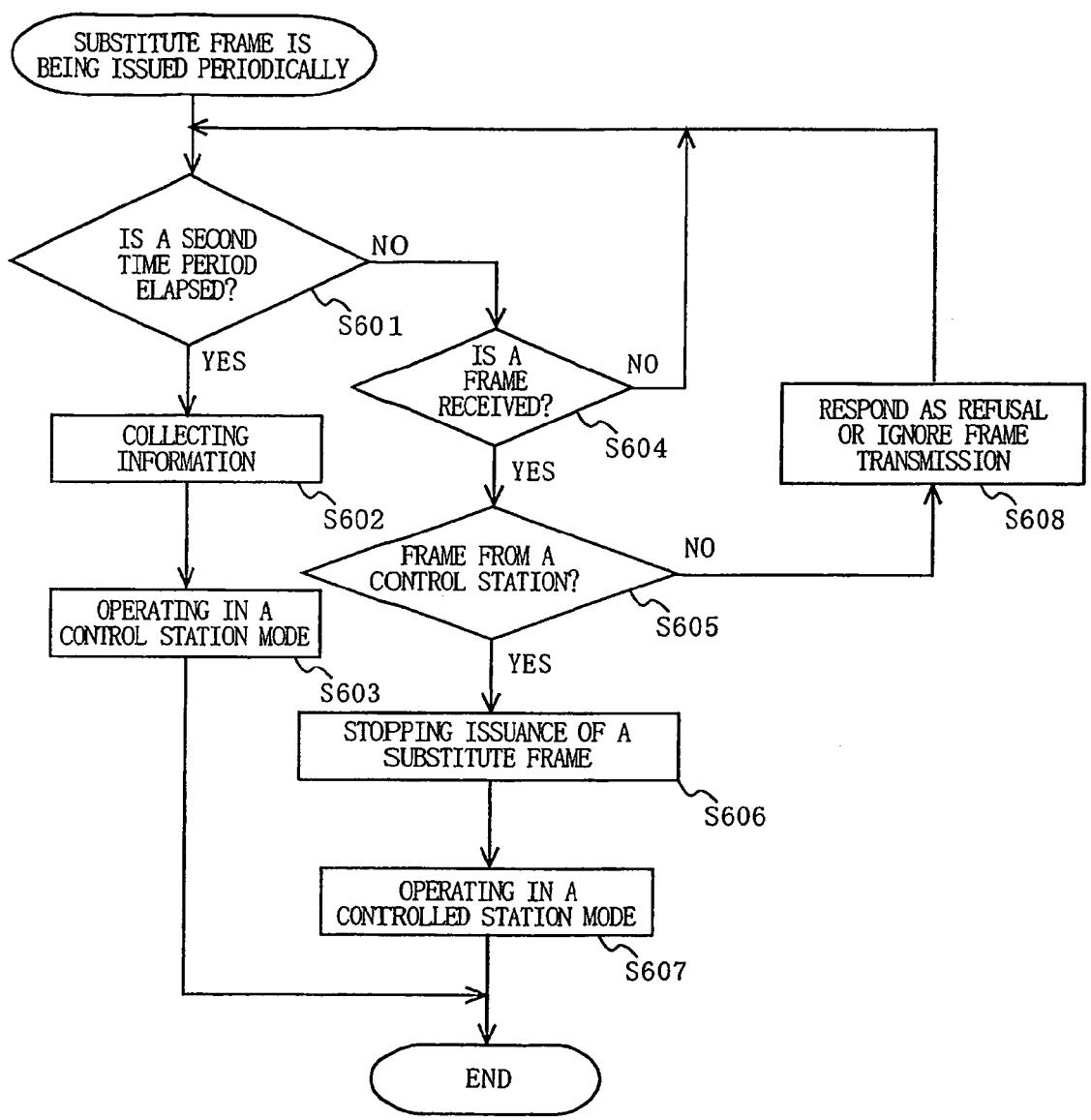
FIG. 19 is a flowchart showing an operation of a terminal which is issuing a substitute frame periodically.

FIG. 19 is a flowchart showing an operation of a terminal which is issuing a substitute frame periodically. Hereinafter, the operation of the terminal which is issuing a substitute frame periodically will be described with reference to FIG. 19.

It is here assumed that the substitute frame issuance portion 334 is issuing a substitute frame periodically. The substitute frame issuance portion 334 determines whether or not a predetermined wait time for recovery of a control station (second time period) is elapsed (step S601). Specifically, the substitute frame issuance portion 334 determines whether or not a timer which is set to be TIME_TENT is expired or a counter which is set to be CNT_TENT is expired. Note that the second time period may be longer or shorter than or the same as the first time period.

When the control station recovery wait time is not elapsed, the substitute frame issuance portion 334 determines whether or not a frame is received (step S604). When a frame is not received, the substitute frame issuance portion 334 returns to the operation of step S601. On the other hand, when a frame is received, the substitute frame issuance portion 334 goes to an operation of step S605.

In step S605, the substitute frame issuance portion 334 determines whether or not the received frame is a frame which is from a control station which has been determined to be disconnected. When the received frame is not a frame from a control station, the substitute frame issuance portion 334 transmits a refusal response frame in response to the received frame, or ignores or does not respond to the received frame (step S608), and returns to the operation of step S601. On the other hand, when the received frame is a frame from a control station, the substitute frame issuance portion 334 goes to an operation of step S606.

In step S606, the substitute frame issuance portion 334 stops issuing a substitute frame. This is because it is recognized that the control station is recovered in the communication system. Thereafter, the substitute frame issuance portion 334 requests the operating mode management portion 320 to operate in a controlled station mode (step S607), and ends the process.

On the other hand, when it is determined that the control station recovery wait time is elapsed in step S601, the substitute frame issuance portion 334 collects information required for the terminal 300 to operate as a control station (control required information) from another terminal (step S602). Specifically, in step S602, when information stored in the control frame memory portion 332 is not sufficient for an operation as a control terminal, the substitute frame issuance portion 334 transmits a request for required information to another terminal, and collects information contained in a frame returned from the other terminal to obtain information required for an operation as a control station. Note that the substitute frame issuance portion 334 may transmit a reset signal to a network and collect a control request from another terminal to collect information required as a control station.

After step S602, the substitute frame issuance portion 334 requests the operating mode management portion 320 to operate in the control station mode (step S603), and ends the process. When operating in the control station mode, a terminal which issues a substitute frame uses the field 43 of a control frame as an identifier for itself. Alternatively, the terminal which issues a substitute frame uses the source address 51 of the frame header 40 in a control frame as an identifier for itself.

The process of step S602 may be executed either before or after the process of step S603. In other words, the required information may be collected after issuance of a control frame. Therefore, when the information required as a control station cannot be sufficiently obtained from the control information stored in the control frame memory portion 332, the terminal which issues a substitute frame transmits an inquiry to another terminal in the communication system while issuing a control frame, to collect the required information. Thereby, network quality is maintained. Alternatively, the terminal which issues a substitute frame may transmits an inquiry to another terminal in the communication system using contents of a substitute frame to collect latest required information. Note that the terminal which issues a substitute frame may continue to refuse a control request until sufficient information is collected.

Figure 20:
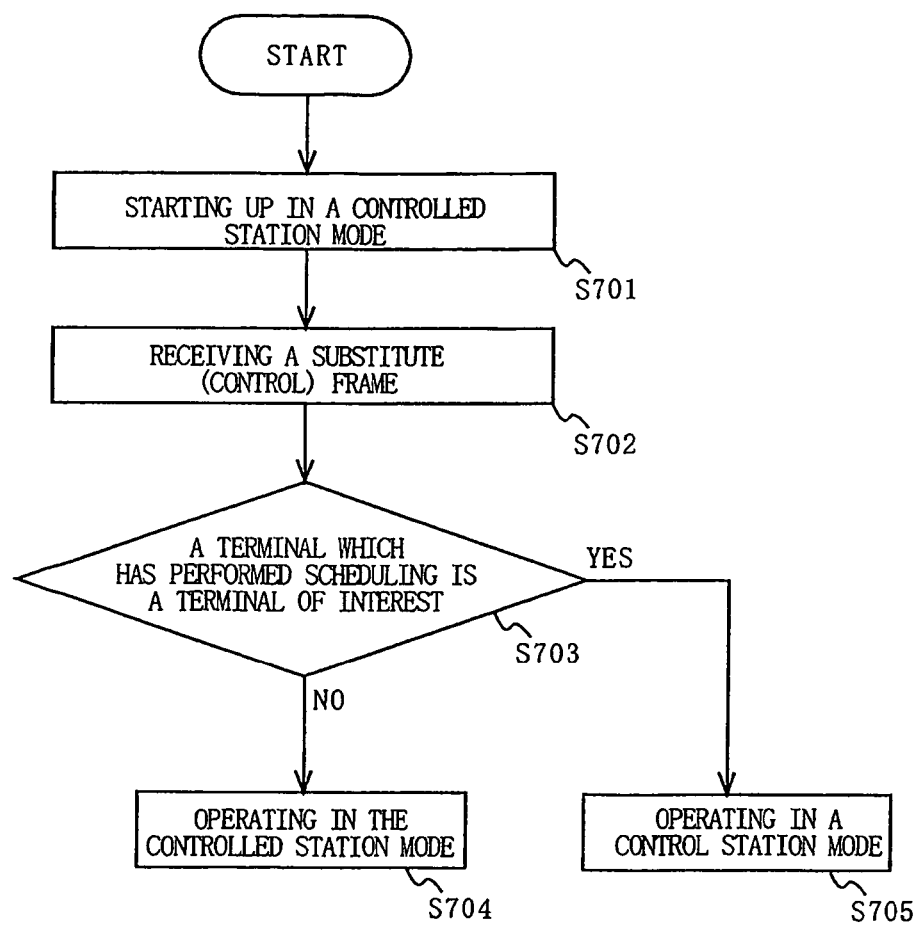
FIG. 20 is a flowchart showing an operation of a terminal which was a control station, when it is connected again to and recovered in a communication system.

FIG. 20 is a flowchart showing an operation of a terminal which was a control station and is thereafter connected again to and recovered in a communication system. Hereinafter, the operation of the terminal which was a control station and is thereafter is connected again to and recovered in a communication system, will be described with reference to FIG. 20. The terminal which was a control station is represented by a terminal A.

Initially, the terminal A starts up in the controlled station mode (step S701). Next, the terminal A receives a substitute (or control) frame (step S702). Note that, in a situation that the second time period is elapsed and therefore a terminal which issues a substitute frame operates as a control station, the terminal A receives a control frame rather than a substitute frame.

After step S702, the terminal A determines whether or not a terminal which performs scheduling of band allocation is set to be the terminal A in the received substitute (or control) frame (step S703). Specifically, when the control frame has a formant of FIG. 16, the terminal A references the field 43 of the substitute frame to determine whether or not a terminal which performs scheduling is the terminal A. Note that when the control frame has the formant of FIG. 17, the terminal A references of the source address 51 of the frame header 40 to determine whether or not a terminal which performs scheduling is the terminal A.

In step S703, when a terminal which performs scheduling is assumed to be the terminal A, the terminal A operates in the control station mode since the frame received in step S702 is a substitute frame (step S705).

On the other hand, when it is determined in step S703 that the terminal which performs scheduling is not the terminal A, the terminal A operates in the controlled station mode since the frame received in step S702 is a control frame which is issued by a new control station (step S704).

Note that, when operating in the control station mode, the terminal A may transmit a particular frame for informing of recovery in the communication system, to a terminal which is operating in the substitute control station, rather than transmitting a control frame.

When operating in the control station mode, the terminal A may issue a control frame by utilizing a band, such as a control frame slot allocated for a control frame or the like. Thereby, it is easier to determine that a terminal which is issuing a substitute frame receives a control frame from a control station in steps S604 and S605.

When operating in the control station mode, the terminal A stores the received substitute frame into the control frame memory portion 332. When operating in the control station mode, the terminal A may reconstruct a control frame using the substitute frame stored in the control frame memory portion 332. However, the substitute frame is constructed based on a control frame previously used, and therefore, may not store control information which is suitable for a latest situation. The control information stored in the substitute frame is only a portion of information required for an operation as a control station. For example, usually, detailed information about requirement for a transmission resource for performing rescheduling of media access, and information about a terminal participating in a network (information about authentication, performance or the like) are not described in a control frame. Therefore, the terminal A collects information from other terminal(s) to obtain control information required as a control station.

Hereinafter, a method of collecting information by the terminal A which operates as a control station will be described. Note that the method described below can be applied to the process in which a terminal which is operating as a substitute control station collects information when operating in the control station mode (step S602 of FIG. 19).

For example, a terminal which operates as a control station uses an empty transmission band to obtain required information from a terminal on the communication system.

For example, an identifier for a terminal which manages band reservation information for achieve QoS must be described in a substitute frame which is a duplicate of a control frame. Therefore, a terminal which operates as a control station issues a confirmation frame for confirming band reservation information, to a terminal which has the identifier, thereby collecting information about band requirement.

For example, a terminal which operates as a control station communicates a terminal which performs authentication management to obtain authentication information, thereby confirming a terminal which participates in the communication system.

Thus, the terminal which operates as a control station transmits an inquiry to a terminal in the communication system to collect required information.

Note that the terminal which operates as a control station may refuse reception of a control request until all required information is obtained.

Thus, according to the third embodiment, when receiving a frame from an original control station during the second time period, the terminal which issues a substitute frame periodically stops issuance of a substitute frame and operates in the controlled station mode. Therefore, a media access control by the original control station can be recovered. As a result, an efficient media access control can be achieved. The terminal which issues a substitute frame periodically transmits a refusal response frame or does not respond to a request from terminals other than an original control station during the second time period. Therefore, a state when the control station was disconnected is maintained until the control station is recovered. Therefore, when the control station is recovered, a post-recovery process can be smoothly performed. When the control station is not recovered after the second time period is elapsed, a terminal which transmits a substitute frame subsequently operates as a control station, thereby eliminating a situation that a control station is absent.

A terminal which becomes a control station since an original control station is not recovered, collects information to obtain information required as a control station if information required for a media access control is insufficient. Therefore, it is possible to avoid a situation that media access is inefficient for a long time in the communication system.

Note that a control station may inform a candidate terminal of control required information or may inform each terminal of control required information by multi-broadcasting. In this case, a controlled station causes the control frame memory portion 332 to store control required information. When the controlled station detects that the control station is disconnected from the communication system since the first time period is elapsed and determines that it will functions as a control station since the second time period is elapsed, the controlled station starts an operation shown in FIG. 21. For example, after the determination of step S601 in FIG. 19 is affirmative, the operation of FIG. 21 is started.

Figure 21:
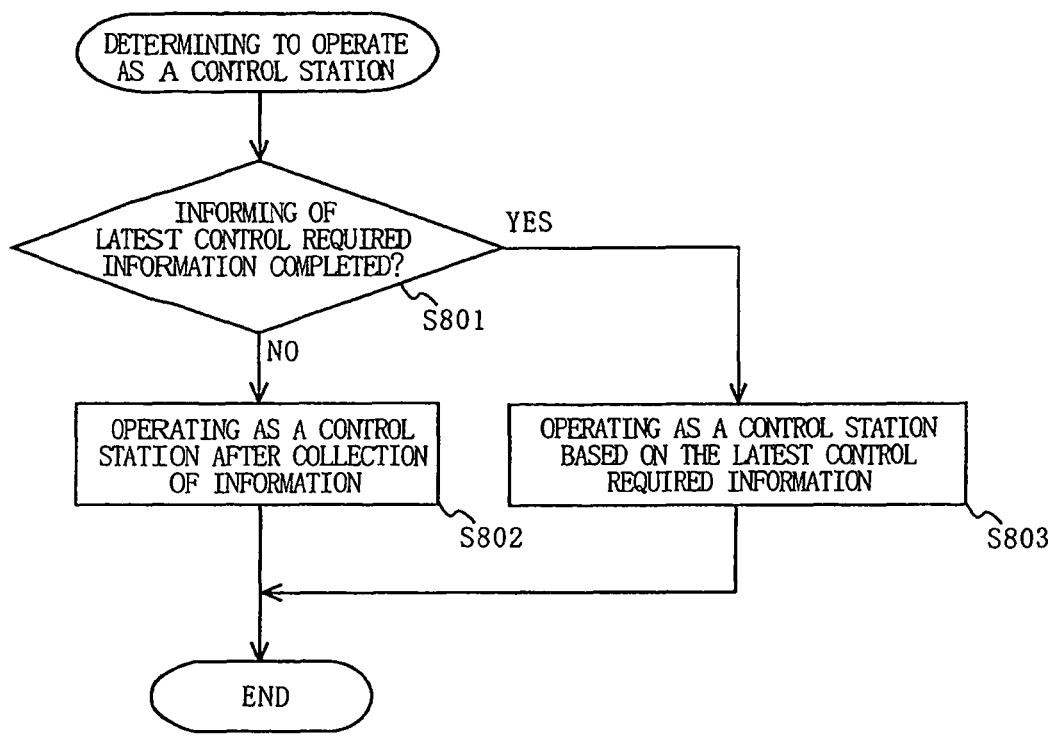
FIG. 21 is a flowchart showing an operation of a terminal after detecting that a control station is disconnected from a communication system and determining that the terminal will function as a control station.

FIG. 21 is a flowchart showing an operation of a terminal after detecting that a control station is disconnected from the communication system and determining that the terminal will function as a control station. In FIG. 21, initially, the terminal determines whether or not the terminal has been informed of latest control required information (step S801). For example, it is assumed that, when control required information includes an item which has not been updated, an identifier for the item which has not been updated is store in a control frame, which is in turn transmitted by a control station. In this case, the terminal determines whether or not there is an item which has not been updated, based on the recorded control information. When there is not an item which has not been updated, the terminal determines that the informing of latest control required information has been completed.

When the informing of latest control required information has been completed, the terminal creates a control frame based on the received control required information and starts operating as a control terminal (step S802). On the other hand, when the informing of latest control required information has not been completed, the terminal starts an operation as a control station after collecting required information as in step S602 of the third embodiment of FIG. 19 (step S803). Note that, when the latest control required information has been partly received in step S803, the terminal may start an operation as a control station using the partly received control required information.

Note that functional blocks required to achieve the terminal of the present invention may be implemented as an integrated circuit (LSI). The functional blocks may be mounted on one chip, or a part or the whole of the functional blocks may be mounted on one chip. As used herein, LSI may be called IC, system LSI, super LSI or ultra LSI, depending on the packaging density. The integrated circuit is not limited to LSI. The integrated circuit may be achieved by a dedicated circuit or a general-purpose processor. Further, an FPGA (Field Programmable Gate Array) which can be programmed after LSI production or a reconfigurable processor in which connection or settings of circuit cells in LSI can be reconfigured, may be used. Furthermore, if an integrated circuit technology which replaces LSI is developed by an advance in the semiconductor technology or other technologies derived therefrom, the functional blocks may be packaged using such a technology. A biotechnology may be applicable.

Figure 22:
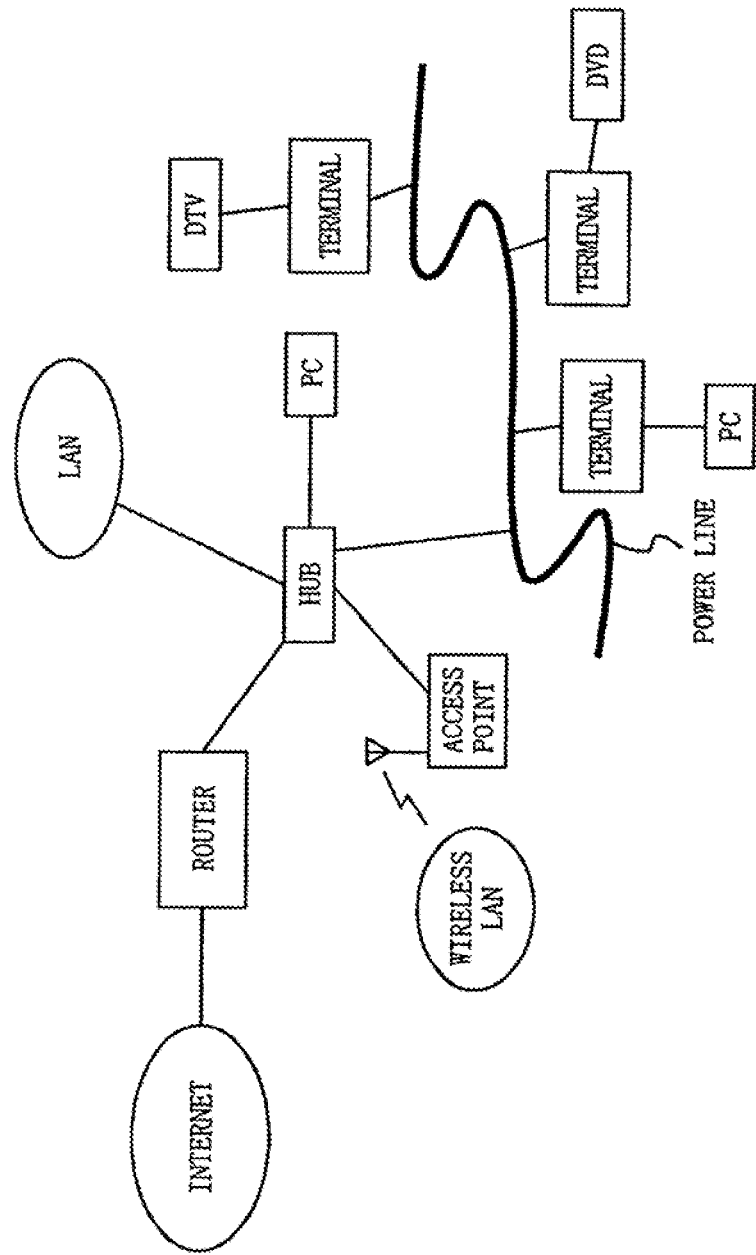
FIG. 22 is a diagram showing a whole structure of a system in which a terminal of the present invention is applied to high-speed power line communication.

Hereinafter, an example in which the above-described embodiment is applied to an actual network system will be described. FIG. 22 is a diagram showing a whole structure of a system in which a terminal of the present invention is applied to high-speed power line communication. As shown in FIG. 22, the terminal of the present invention provides an interface between a multimedia apparatus (e.g., a digital television (DTV), a personal computer (PC), a DVD recorder, etc.) and a power line. An interface between the multimedia apparatus and the terminal of the present invention may be an IEEE1394 interface, a USB interface, an Ethernet (R) interface or the like. With such a structure, a communication network system which transmits digital data, such as multimedia data or the like, via a power line with high speed, is constructed. As a result, a power line which is already provided in home, offices and the like can be used as a network line without newly introducing a network cable, such as a conventional wired LAN. Therefore, the present invention is considerably useful in terms of cost and simplicity of installation.

In the embodiment of FIG. 22, the terminal of the present invention serves as an adaptor which converts a signal interface of an existing multimedia apparatus to an interface of power line communication. The terminal of the present invention may be incorporated into a multimedia apparatus, such as a personal computer, a DVD recorder, a digital television, a home server system or the like. Thereby, data transfer between apparatuses can be achieved via a power source cable of the multimedia apparatus. In this case, a line for connecting the adaptor and the power line, an IEEE1394 cable, a USB cable, and an Ethernet (R) cable are not required, thereby simplifying wiring.

Also, a communication network system which uses a power line can be connected via a router and/or a hub to the Internet, a wireless LAN, and a conventional wired cable LAN, thereby extending a LAN system in which the communication network system of the present invention is used without any problem.

Communication data transferred via a power line may be intercepted by an apparatus directly connected to the power line, but is free from an eavesdrop problem with wireless LAN. Therefore, the power line transmission scheme is effective in terms of security. Further, data transferred on a power line may be protected by IPSec of an IP protocol, encryption of the contents themselves, other DRM schemes, or the like.

In the future, it is expected that a control station is provided as a particular terminal distinguished from a semi-fixed terminal having a general function, in the high-speed power line communication, if taking into consideration coexistence of adjacent access systems, provision of a gateway/router function, positional characteristics of a power line, expected characteristics of a vender, and the like. Therefore, when a semi-fixed control station is used, indiscriminately changing of control stations would lead to a situation that communication quality is not guaranteed. Therefore, a system of the present invention is practically very useful, in which, when a control station is disconnected from a communication system, another terminal issues a substitute frame, and thereafter, if a control station is recovered, issuance of a control frame is inherited to the recovered control station.

As described above, when a central control network protocol which uses a communication medium, such as a radio wave, a power line, a telephone line, a coaxial cable or the like, which has less reliable communication quality, is employed to construct a home network communication system, the terminal of the present invention may be used as a home electrical product which is a communication module having a communication function. For a home network communication system, situations, such as the power source of a control station which have an important influence on a whole communication system is abruptly shut down, a connecting point of a control station and a communication medium is removed, and the like, are readily expected. In these situations, the present invention provides a substitute control station which issues a substitute frame to keep a communication process effective. Therefore, there is a possibility that the present invention provides a means for optimizing communication quality of a communication system, and further, solving an adjacent network interference problem and an adjacent channel interference problem.

While the invention has been described in detail, the foregoing description is in all aspects illustrative and not restrictive. It is understood that numerous other modifications and variations can be devised without departing from the scope of the invention.

INDUSTRIAL APPLICABILITY

The terminal of the present invention can avoid a situation that a communication system falls into an inefficient state for a long time, and is useful in communication fields, such as wireless communication, power line communication and the like.

The invention claimed is:

1. A terminal for use in a communication system including a terminal which acts as a control station, and a plurality of terminals which act as controlled stations, the terminal comprising:

a control frame detection section for detecting a control
frame received from the current control station when the
terminal acts as one of the controlled stations, the control
frame including access scheduling information, in units
of data streams, indicating a time which is allocated to
each data stream and which is scheduled by the current
control station in accordance with a request for band
allocation from the terminal in the communication system;

an operation mode management section for
when a disconnection of the current control station from
a network is detected, starting an operation as a substitute control station which refuses receipt of the
request for band allocation from another terminal in
the communication system, forming a substitute
frame based on latest access scheduling information
included in the control frame received from the control station, and transmitting the substitute frame to
the other terminal, and
if the control station is not recovered before a predetermined time period is elapsed from the start point of the
operation as the substitute control station, starting an
operation as a new control station which receives the
request for band allocation from the other terminal,
forming the access scheduling information in
response to the request for band allocation, and transmitting a control frame including the access scheduling information; and
an access control section for collecting, from the other
terminal, the latest request for band allocation corresponding to the access scheduling information included
in the received control frame, when the terminal starts
the operation as the new control station,
wherein the access control section collects, from the other
terminal, the latest request for band allocation by transmitting, to the other terminal, a request for acquiring the
request for band allocation, when the terminal starts the
operation as the new control station.

2. A terminal for use in a communication system including
a terminal which acts as a control station, and a plurality of
terminals which act as controlled stations, the terminal comprising:
a control frame detection section for detecting a control
frame received from the current control station when the
terminal acts as one of the controlled stations, the control
frame including access scheduling information, in units
of data streams, indicating a time which is allocated to
each data stream and which is scheduled by the current
control station in accordance with a request for band
allocation from the terminal in the communication system;
an operation mode management section for
when a disconnection of the current control station from
a network is detected, starting an operation as a substitute control station which refuses receipt of the
request for band allocation from another terminal in
the communication system, forming a substitute
frame based on latest access scheduling information
included in the control frame received from the control station, and transmitting the substitute frame to
the other terminal, and
if the control station is not recovered before a predetermined time period is elapsed from the start point of the
operation as the substitute control station, starting an
operation as a new control station which receives the
request for band allocation from the other terminal,
forming the access scheduling information in
response to the request for band allocation, and transmitting a control frame including the access scheduling information; and
an access control section for collecting, from the other
terminal, the latest request for band allocation corresponding to the access scheduling information included
in the received control frame, when the terminal starts
the operation as the new control station,
wherein the access control section collects, from the other
terminal, the latest request for band allocation before
issuance of a first control frame, when the terminal starts
the operation as the new control station.

3. A method performed by a terminal for use in a communication system including a terminal which acts as a control
station, and a plurality of terminals which act as controlled
stations, the method comprising:
detecting a control frame received from the current control
station when the terminal acts as one of the controlled
stations, the control frame including access scheduling
information, in units of data streams, indicating a time
which is allocated to each data stream and which is
scheduled by the current control station in accordance
with a request for band allocation from the terminal in
the communication system;
when a disconnection of the current control station from a
network is detected, starting an operation as a substitute
control station which refuses receipt of the request for
band allocation from another terminal in the communication system, forming a substitute frame based on latest
access scheduling information included in the control
frame received from the control station, and transmitting
the substitute frame to the other terminal;
if the control station is not recovered before a predetermined time period is elapsed from the start point of the
operation as the substitute control station, starting an
operation as a new control station which received the
request for band allocation from the other terminal,
forming the access scheduling information in response
to the request for band allocation, and transmitting a
control frame including the access scheduling information; and
collecting, from the other terminal, the latest request for
band allocation corresponding to the access scheduling
information included in the received control frame,
when the terminal starts the operation as the new control
station,
wherein the latest request for band allocation is collected
from the other terminal by transmitting, to the other
terminal, a request for acquiring the request for band
allocation, when the terminal starts the operation as the
new control station.

4. A method performed by a terminal for use in a communication system including a terminal which acts as a control
station, and a plurality of terminals which act as controlled
stations, the method comprising:
detecting a control frame received from the current control
station when the terminal acts as one of the controlled
stations, the control frame including access scheduling
information, in units of data streams, indicating a time
which is allocated to each data stream and which is
scheduled by the current control station in accordance
with a request for band allocation from the terminal in
the communication system;
when a disconnection of the current control station from a
network is detected, starting an operation as a substitute
control station which refuses receipt of the request for
band allocation from another terminal in the communication system, forming a substitute frame based on latest access scheduling information included in the control frame received from the control station, and transmitting the substitute frame to the other terminal;

if the control station is not recovered before a predetermined time period is elapsed from the start point of the operation as the substitute control station, starting an operation as a new control station which received the request for band allocation from the other terminal, forming the access scheduling information in response to the request for band allocation, and transmitting a control frame including the access scheduling information; and collecting, from the other terminal, the latest request for band allocation corresponding to the access scheduling information included in the received control frame, when the terminal starts the operation as the new control station, wherein the latest request for band allocation is collected from the other terminal before issuance of a first control frame, when the terminal starts the operation as the new control station.

* * * * *